United States Patent
Murphey et al.

(10) Patent No.: US 12,334,864 B2
(45) Date of Patent: Jun. 17, 2025

(54) RETRACTABLE MAST SOLAR ARRAY

(71) Applicant: Opterus Research and Development, Inc., Fort Collins, CO (US)

(72) Inventors: Thomas W. Murphey, Fort Collins, CO (US); Edward Smutney, Boulder, CO (US); Daniel Hunt, Fort Collins, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 0 days.

(21) Appl. No.: 17/657,245

(22) Filed: Mar. 30, 2022

(65) Prior Publication Data

US 2022/0321056 A1 Oct. 6, 2022

Related U.S. Application Data

(60) Provisional application No. 63/170,134, filed on Apr. 2, 2021.

(51) Int. Cl.
*H02S 30/20* (2014.01)
*B64G 1/22* (2006.01)
*B64G 1/44* (2006.01)
*H02S 10/40* (2014.01)

(52) U.S. Cl.
CPC ............ *H02S 30/20* (2014.12); *B64G 1/2224* (2023.08); *B64G 1/44* (2013.01); *H02S 10/40* (2014.12)

(58) Field of Classification Search
None
See application file for complete search history.

(56) References Cited

U.S. PATENT DOCUMENTS

| | | | |
|---|---|---|---|
| 8,816,187 B1 * | 8/2014 | Stribling | B64G 1/44 244/172.7 |
| 9,324,893 B1 | 4/2016 | Kats et al. | |
| 9,444,394 B1 * | 9/2016 | Thomas | H02S 20/30 |
| 10,370,126 B1 * | 8/2019 | Harvey | B64G 1/222 |
| 2013/0285595 A1 * | 10/2013 | Eaton, Jr. | H02S 20/00 320/101 |
| 2019/0071191 A1 * | 3/2019 | Francis | B64G 1/443 |
| 2019/0263540 A1 | 8/2019 | Abrams et al. | |
| 2021/0013830 A1 * | 1/2021 | Francis | H02S 30/20 |
| 2021/0156148 A1 * | 5/2021 | Daton-Lovett | E04C 3/005 |

OTHER PUBLICATIONS

PCT International Search Report and Written Opinion of the International Searching Authority of PCT/US2022/022777 dated Jan. 20, 2023 (11 pages).

* cited by examiner

*Primary Examiner* — Dustin Q Dam
(74) *Attorney, Agent, or Firm* — Harris Beach Murtha Cullina PLLC

(57) ABSTRACT

A retractable mast solar array includes a collapsible boom extensible by a boom deployer. At least one foldable upper arm assembly is coupled to the collapsible boom. At least one foldable lower arm assembly coupled to the collapsible boom. A foldable solar array includes two or more columns of blanket elements, each column of blanket elements is affixed at one end to the at least one foldable upper arm assembly and at an opposite end to the at least one foldable lower arm assembly. In a stowed state, the two or more columns of blanket elements are stowed folded in either or both of the at least one foldable upper arm assembly or the at least one foldable lower arm assembly, and in a deployed state, the two or more columns of blanket elements are unfolded to a deployed solar array.

18 Claims, 34 Drawing Sheets

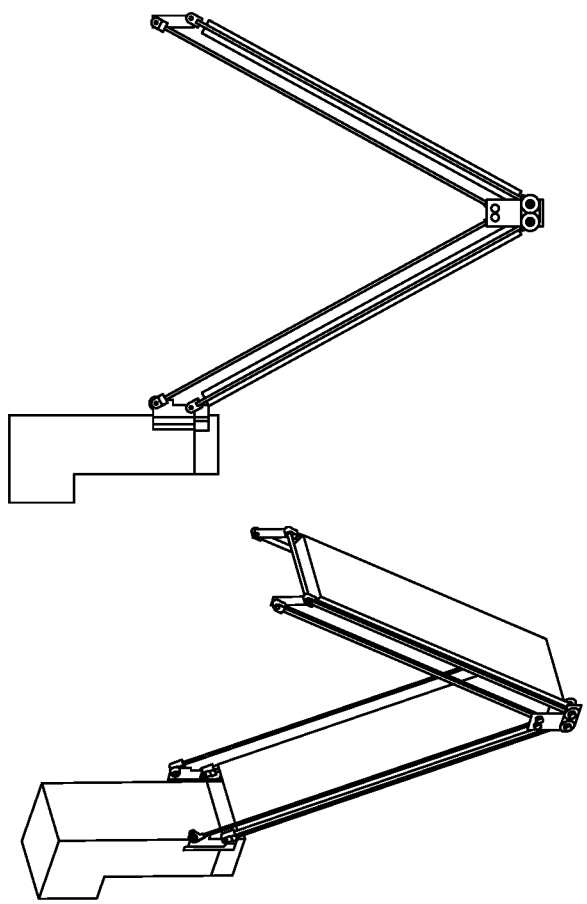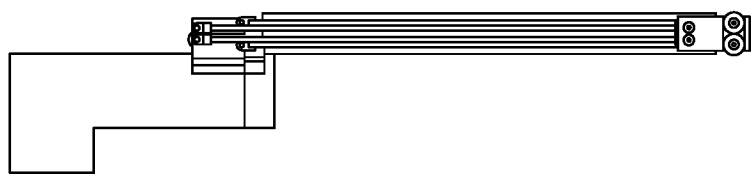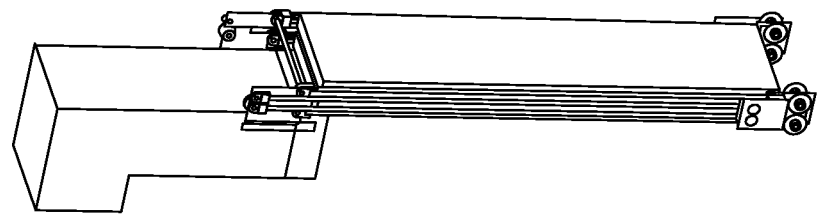
FIG.7

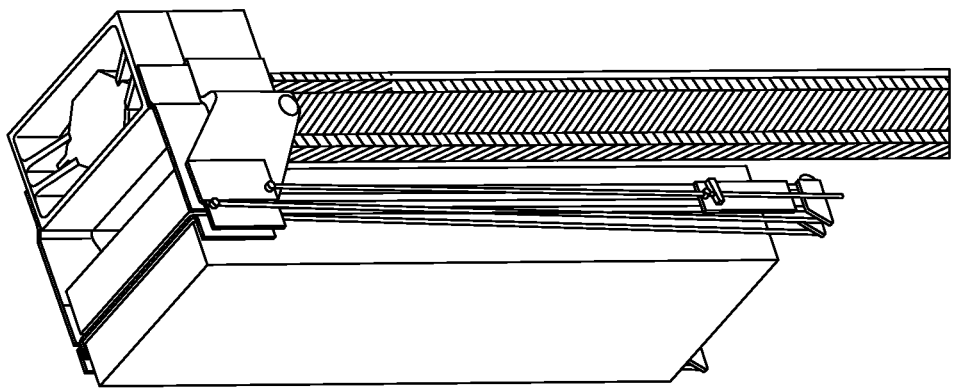
STOWED
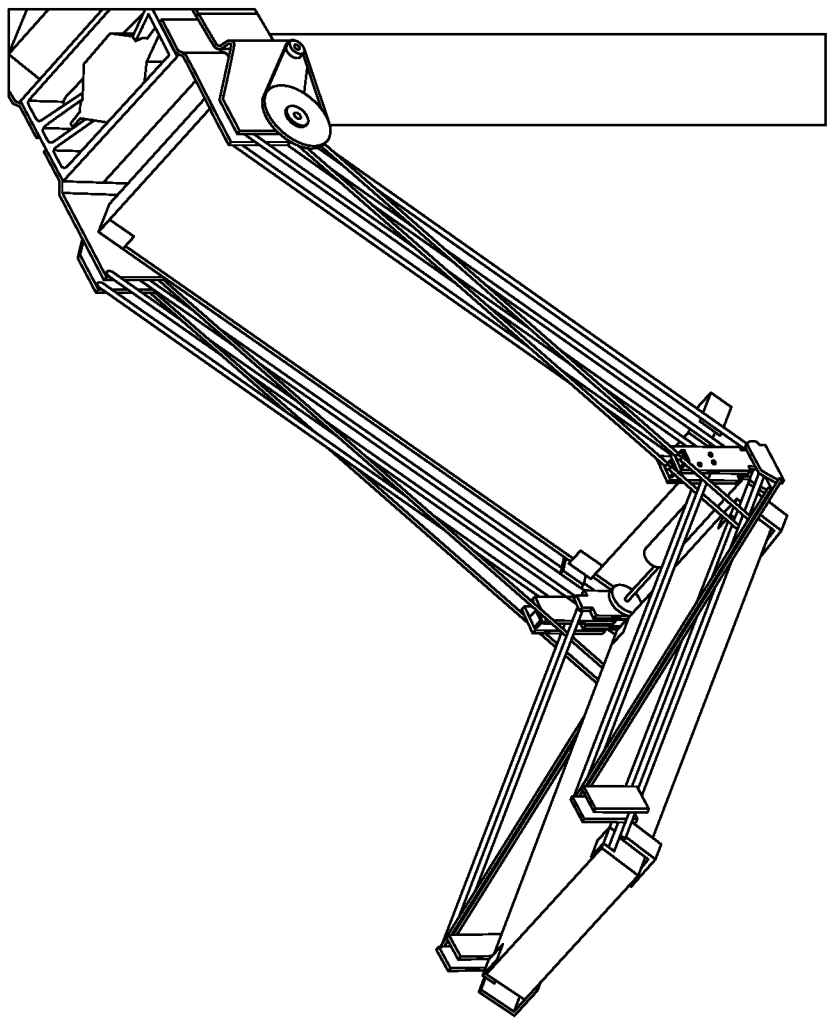
PARTIALLY DEPLOYED
FIG.8

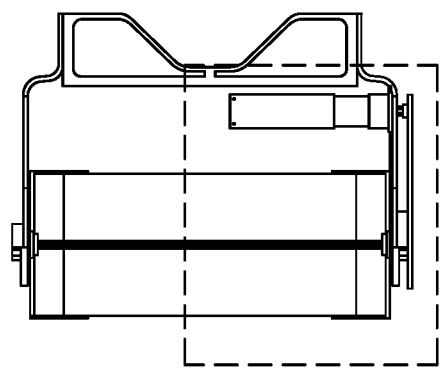
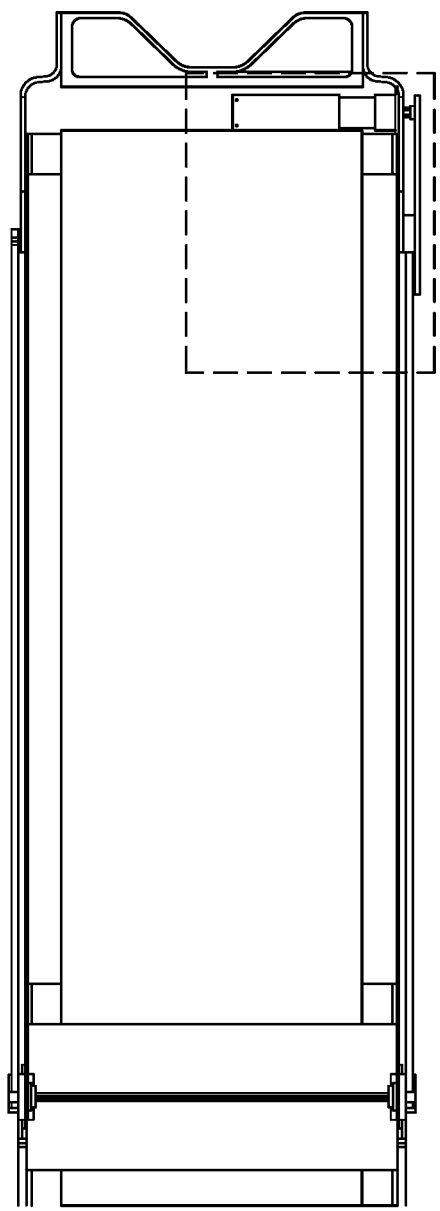
FIG.15

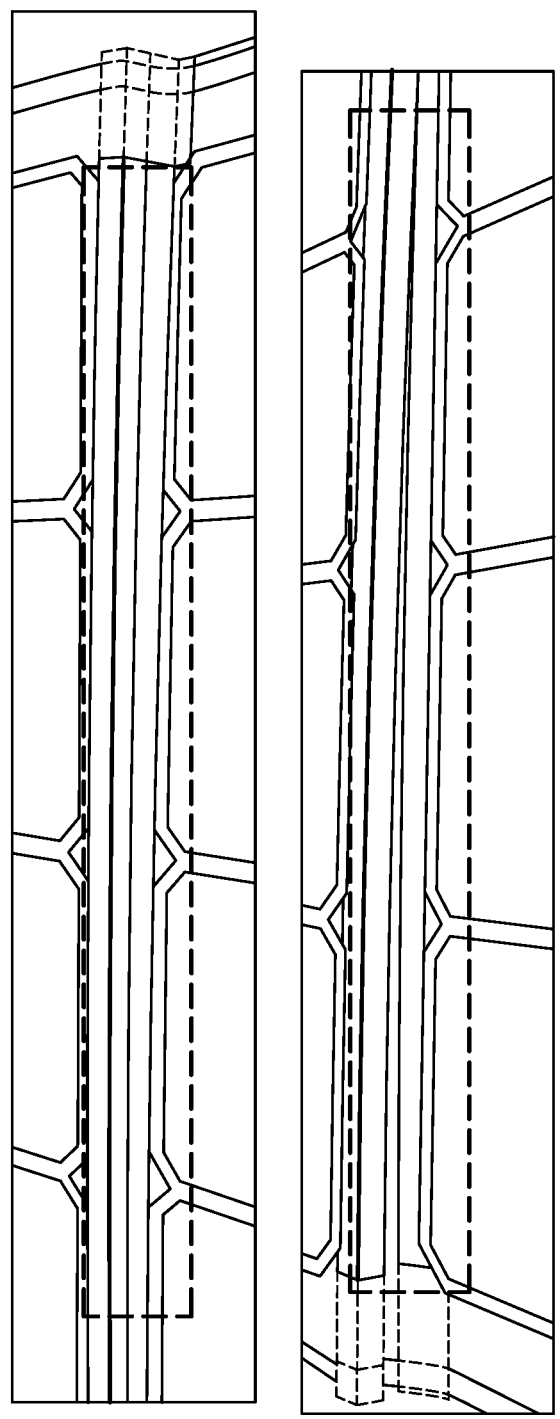
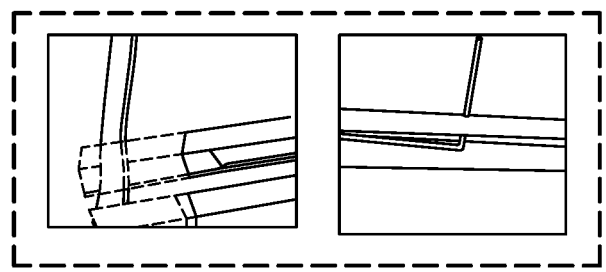
FIG. 20

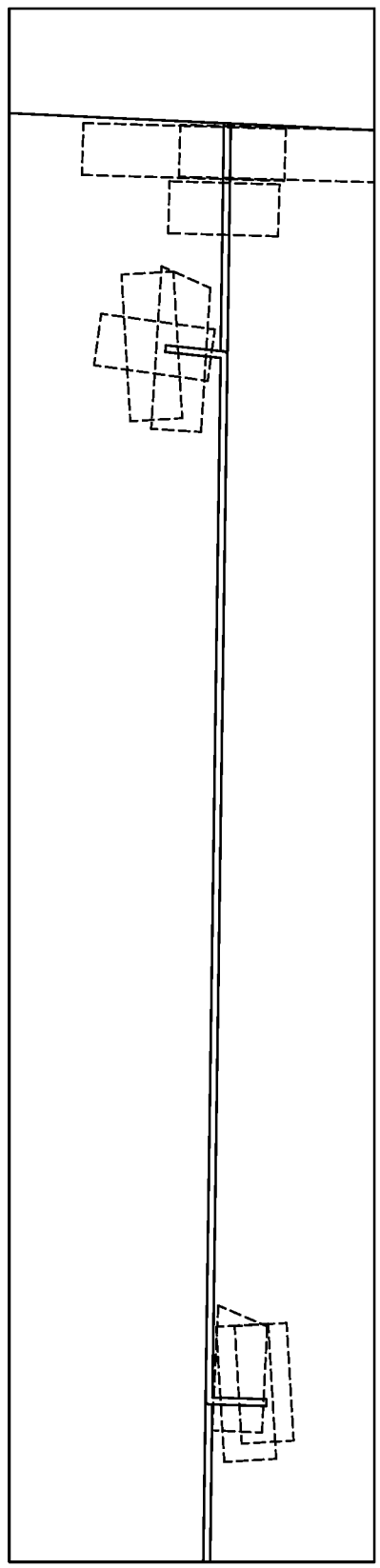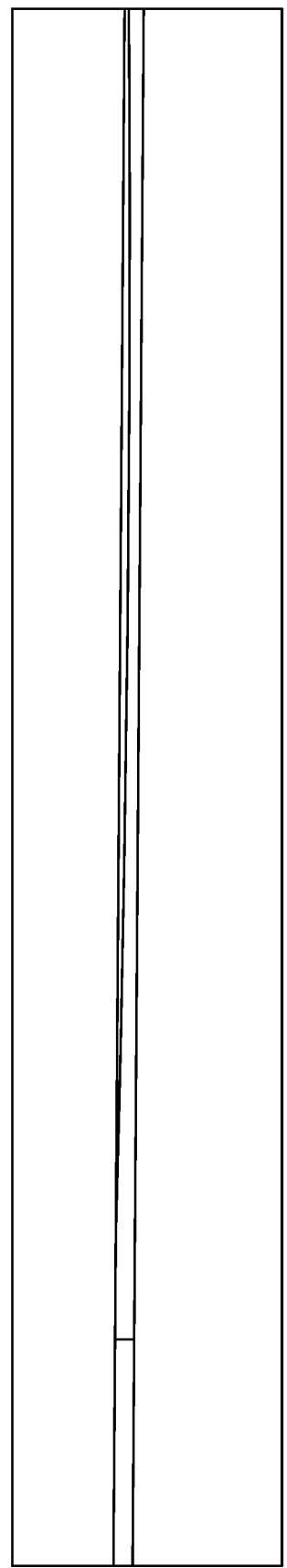
FIG.22

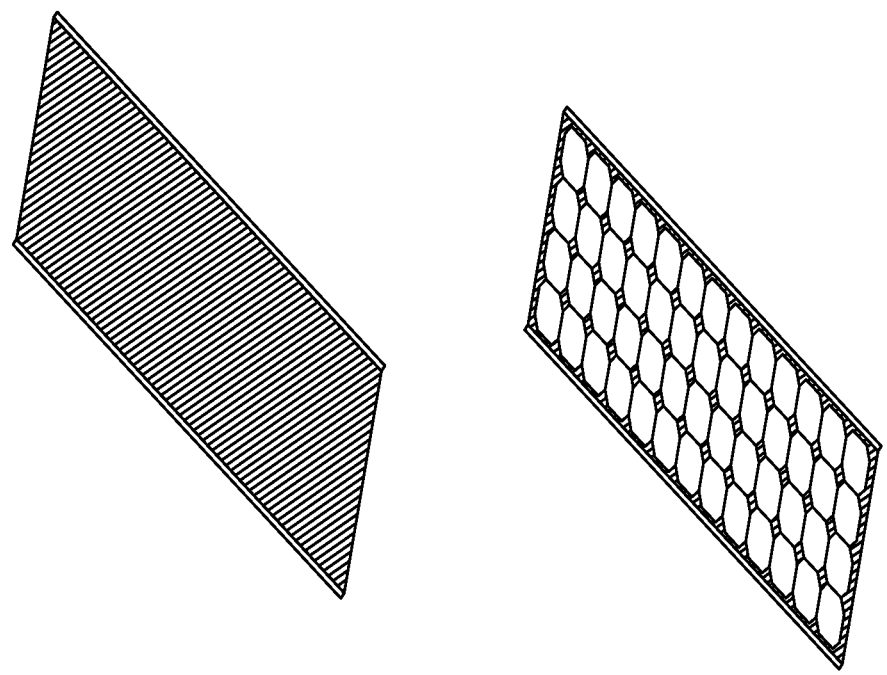
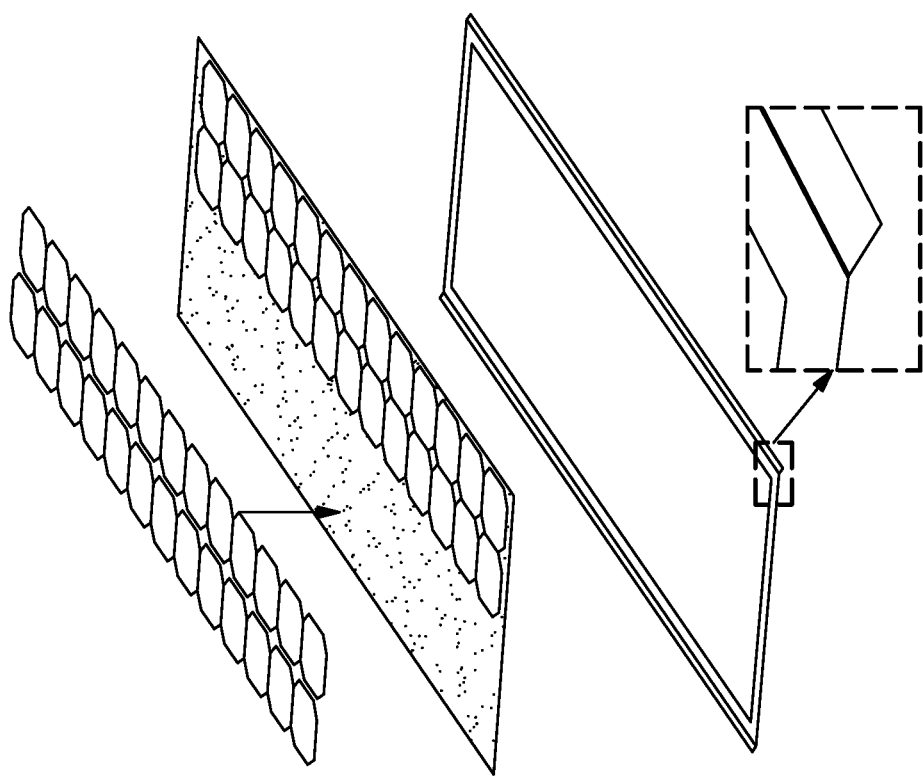
FIG.25

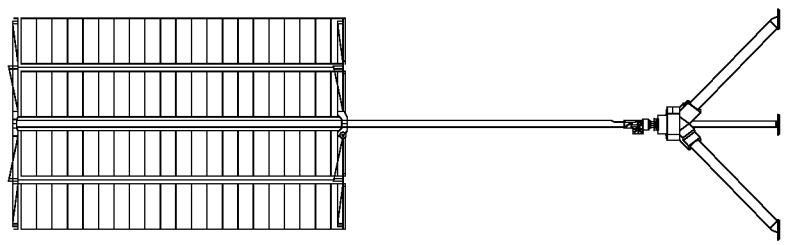
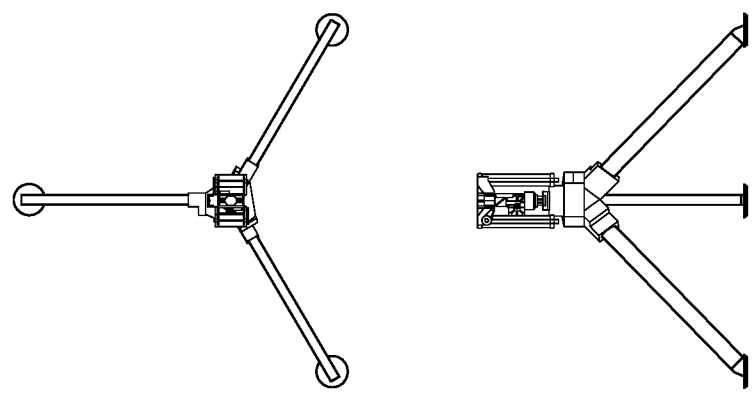
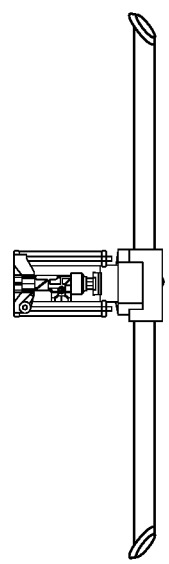
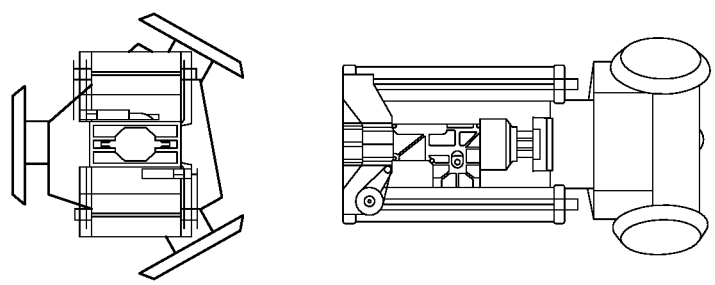
FIG.27

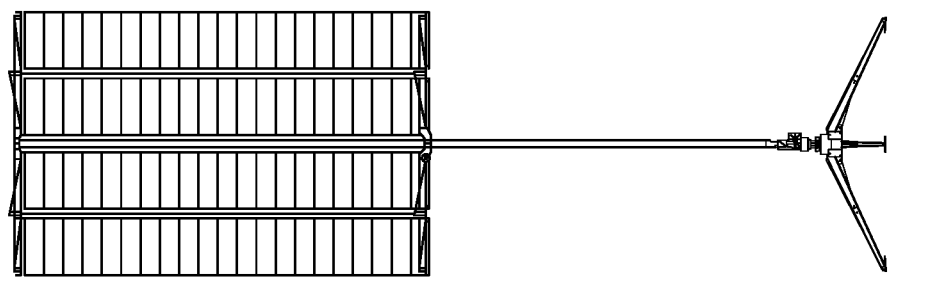
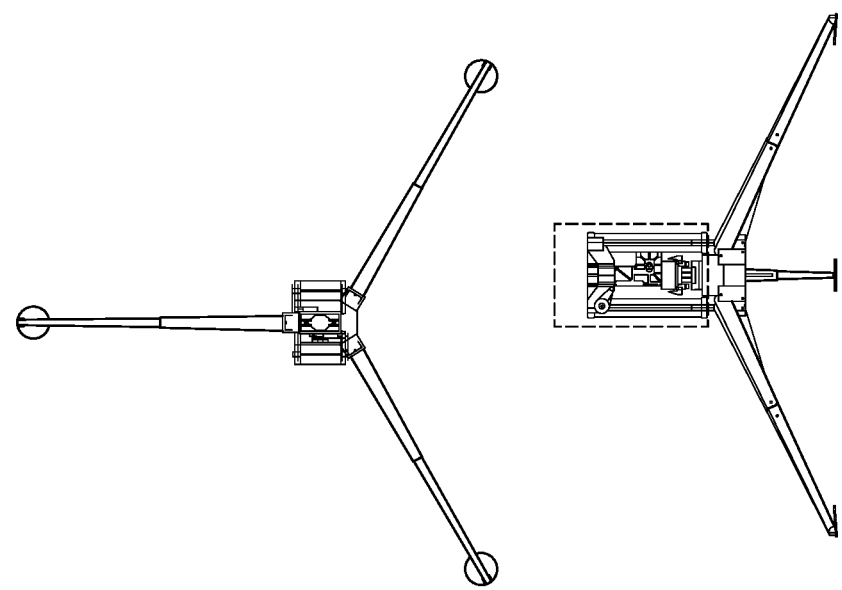
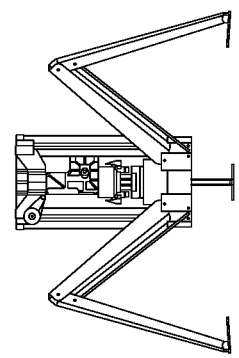
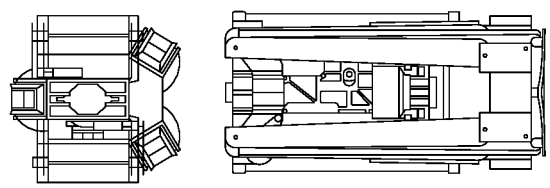
FIG. 28

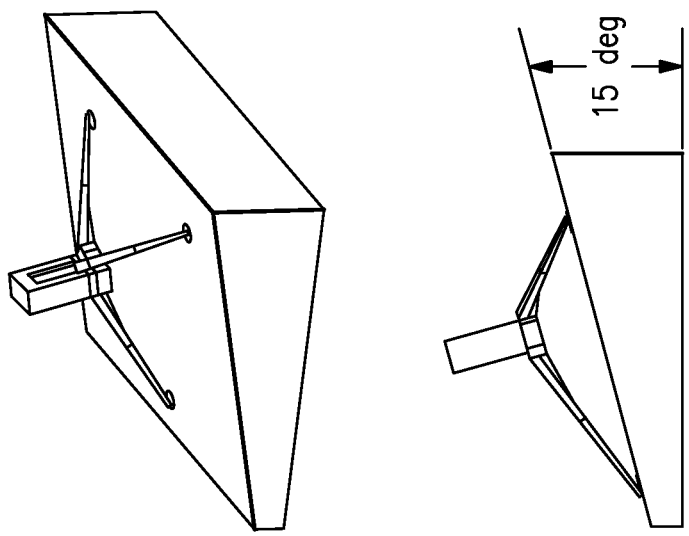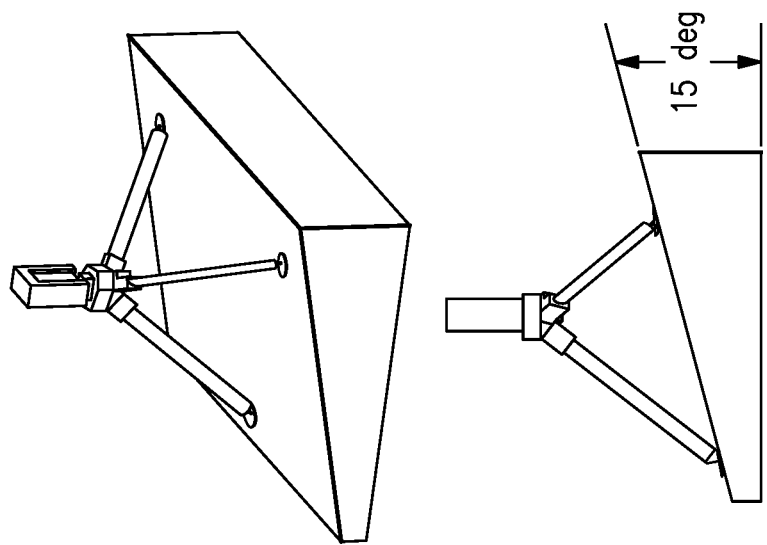
FIG.29

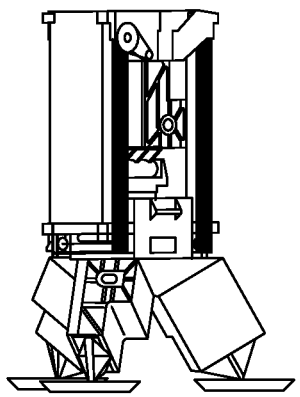
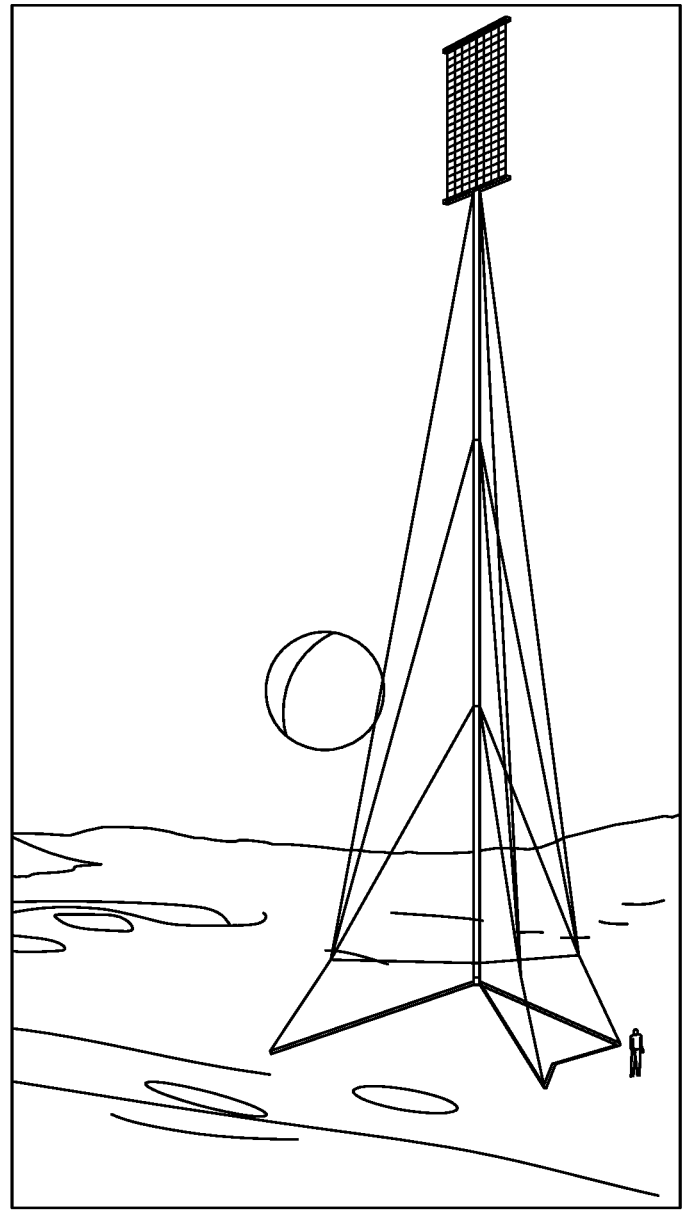
FIG.30

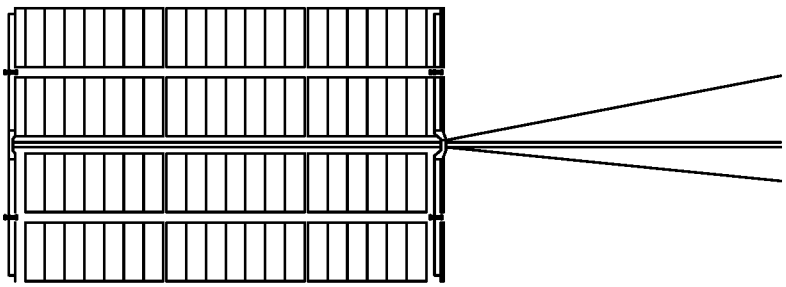
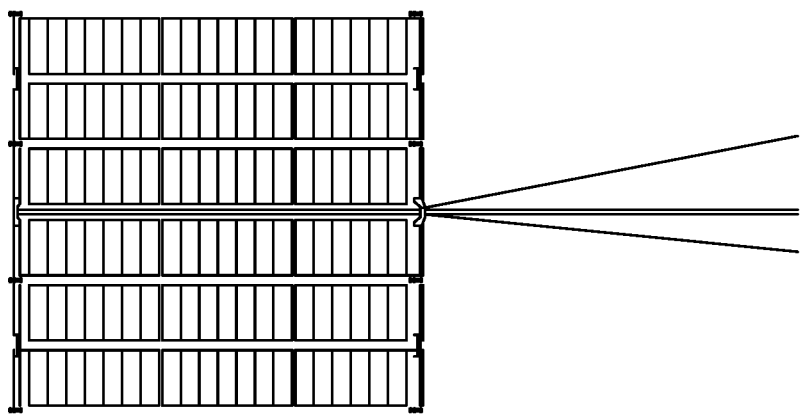
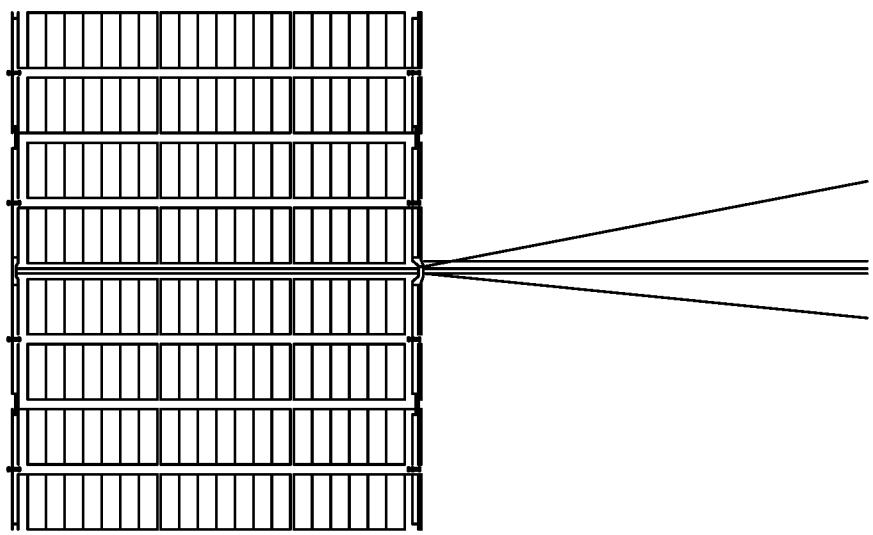
FIG.34

RETRACTABLE MAST SOLAR ARRAY

CROSS-REFERENCE TO RELATED APPLICATIONS

This application claims priority to and the benefit of U.S. provisional patent application Ser. No. 63/170,134, RETRACTABLE MAST SOLAR ARRAY, filed Apr. 2, 2021, which application is incorporated herein by reference in its entirety.

STATEMENT REGARDING FEDERALLY FUNDED RESEARCH OR DEVELOPMENT

This invention was made with Government support under contract 80NSSC19C0238 awarded by NASA. The Government has certain rights in the invention.

FIELD OF THE APPLICATION

The application relates to a solar array, particularly to a deployable solar array.

BACKGROUND

Solar arrays are needed to provide electrical power in both spaceborne applications (e.g. satellites) and surface applications on celestial bodies including the moon and planets.

SUMMARY

A retractable mast solar array includes a collapsible boom extensible by a boom deployer. At least one foldable upper arm assembly is coupled to the collapsible boom. At least one foldable lower arm assembly coupled to the collapsible boom. A foldable solar array includes two or more columns of blanket elements, each column of blanket elements is affixed at one end to the at least one foldable upper arm assembly and at an opposite end to the at least one foldable lower arm assembly. In a stowed state, the two or more columns of blanket elements are stowed folded in either or both of the at least one foldable upper arm assembly or the at least one foldable lower arm assembly, and in a deployed state, the two or more columns of blanket elements are unfolded to a deployed solar array.

The collapsible boom can be a collapsible tubular mast. The collapsible tubular mast can be a trussed collapsible tubular mast.

At least one foldable arm can include parallelogram linkages. At least one foldable arm can include at least two tension diagonals. At least one foldable arm can include a double parallelogram linkage gearing. At least one foldable arm can include a synchronized gearing. At least one foldable arm can include a motor drive.

The foldable solar array can include two or more columns of Z fold blanket elements.

Each blanket element can be coupled to an adjacent blanket element by a pair of ribbons disposed in a columnar direction and mechanically coupled to either side of each of the blanket elements.

At least one torsion rod can be disposed between blanket elements. The at least one torsion rod can provide a spring bias to a folded blanket state.

Each blanket element can further include an edge stiffener.

The at least one foldable upper arm assembly can be mechanically coupled at a position on the collapsible boom. During deployment, the at least one foldable lower arm assembly slidingly moves along the collapsible boom away from the at least one foldable upper arm assembly to deploy the foldable solar array to a deployed solar array state.

The at least one foldable lower arm assembly can be mechanically coupled at a position on the collapsible boom. During deployment, the at least one foldable upper arm assembly slidingly moves along the collapsible boom away from the at least one foldable lower arm assembly to deploy the foldable solar array to a deployed solar array state.

The at least one foldable upper arm assembly and the at least one foldable lower arm assembly can be nestingly folded together in the stowed state.

The retractable mast solar array can further include additional folded arm sections on either side of the at least one foldable upper arm assembly and the at least one foldable lower arm assembly to support additional columns of blankets.

The retractable mast solar array can further include a base pedestal. The base pedestal can include a plurality of guy wires attached to a collar slidingly mounted on the collapsible boom.

The retractable mast solar array can also be mechanically coupled to a satellite bus.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

The collapsible boom can be a collapsible tubular mast. The collapsible tubular mast can be a trussed collapsible tubular mast.

FIG. 7 is a drawing showing stowed and partially unfolded parallelogram arms;

FIG. 8 is a drawing showing exemplary nested lower and upper arm assemblies with blankets stowed;

FIG. 15 is a drawing showing a top view of the lower arm assembly of FIG. 14 in a both a deployed and stowed state;

FIG. 20 is a drawing showing exemplary tension rods installed on a prototype Z-folding blanket;

FIG. 22 is a drawing showing a torsion rod deployed and torsion rod stowed;

FIG. 25 is a drawing showing cells bonded to a weave of a of an exemplary CBE layout;

FIG. 27 is a drawing showing the deployment stages of an exemplary T-CTM base/pedestal;

FIG. 28 is a drawing showing the deployment stages of an exemplary four bar base/pedestal;

FIG. 29 is a drawing showing an exemplary base/pedestal on an uneven terrain;

FIG. 30 is a drawing showing an exemplary depiction of a retractable mast solar array according to the Application deployed on the Lunar surface;

FIG. 34 is a drawing showing exemplary 8, 6, and 4 blanket configurations.

DETAILED DESCRIPTION

Figure 1:
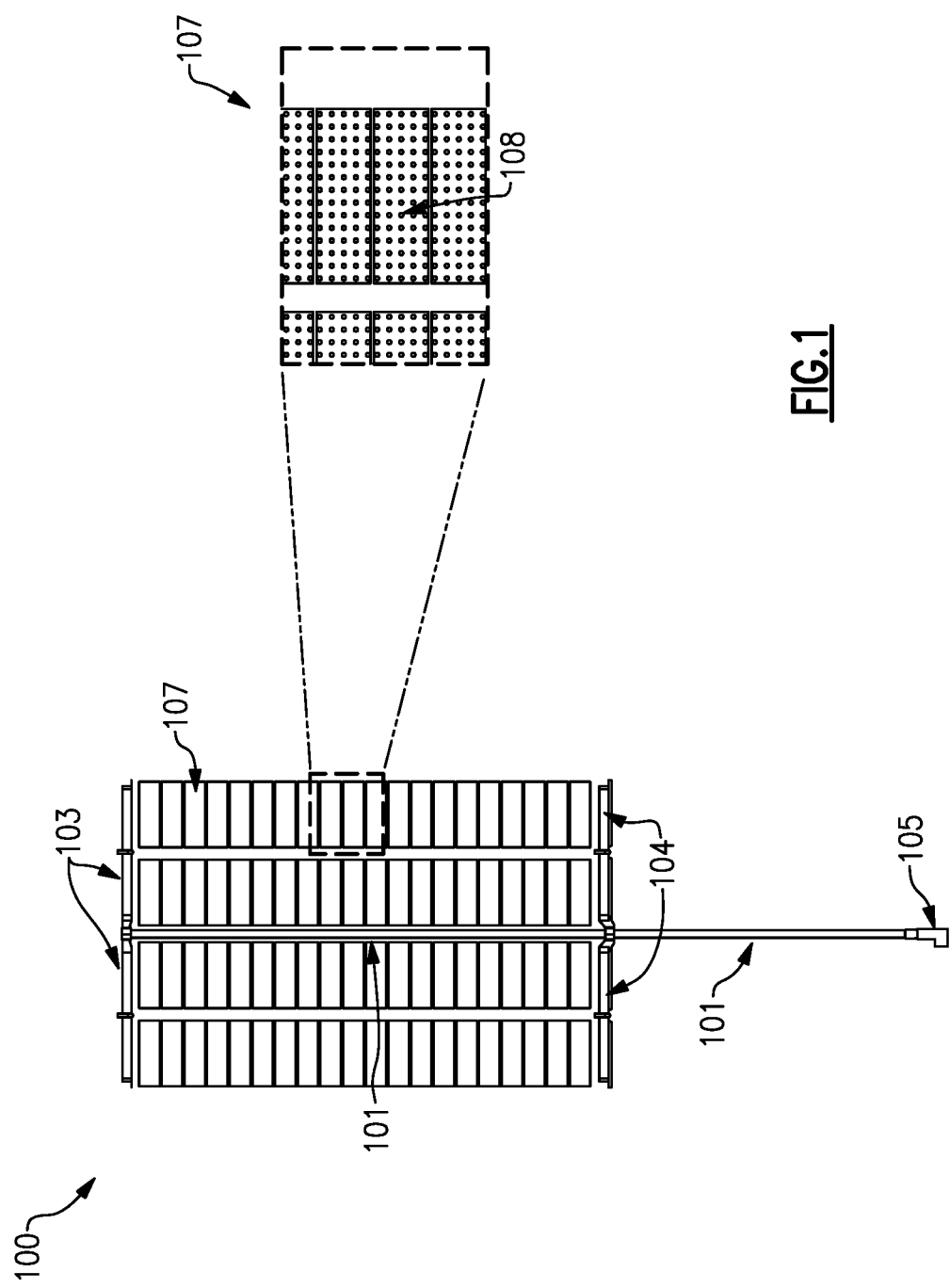
FIG. 1 is a drawing showing a deployed layout of a retractable mast solar array according to the Application.

FIG. 1 is a drawing showing a deployed layout of a retractable mast solar array according to the Application. A retractable mast solar array 100 according to the Application includes a collapsible boom 101 extensible by a boom deployer 105. At least one foldable upper arm assembly 103 is coupled to the collapsible boom 101. At least one foldable lower arm assembly 104 is coupled to the collapsible boom 101. Either of the at least one foldable upper arm assembly 103 is or the at least one foldable lower arm assembly 104 is mechanically coupled (fixed coupled at a position) to the collapsible boom 101, while the other is slidingly coupled to the collapsible boom 101. A foldable solar array 107 includes two or more columns of blanket elements 108, each column of blanket elements 108 is affixed at one end to the at least one foldable upper arm assembly 103 and at an opposite end to the at least one foldable lower arm assembly 104. In a stowed state (e.g. FIG. 4, FIG. 5, FIG. 7, FIG. 8, FIG. 12, FIG. 13, FIG. 27, FIG. 28), the two or more columns of blanket elements 108 are stowed folded in either or both of the at least one foldable upper arm assembly or the at least one foldable lower arm assembly, and in a deployed state (e.g. FIG. 4, FIG. 5, FIG. 7, FIG. 9, FIG. 10, FIG. 11, FIG. 13, FIG. 14, FIG. 27, FIG. 28), the two or more columns of blanket elements are unfolded to a deployed solar array.

Figure 2:
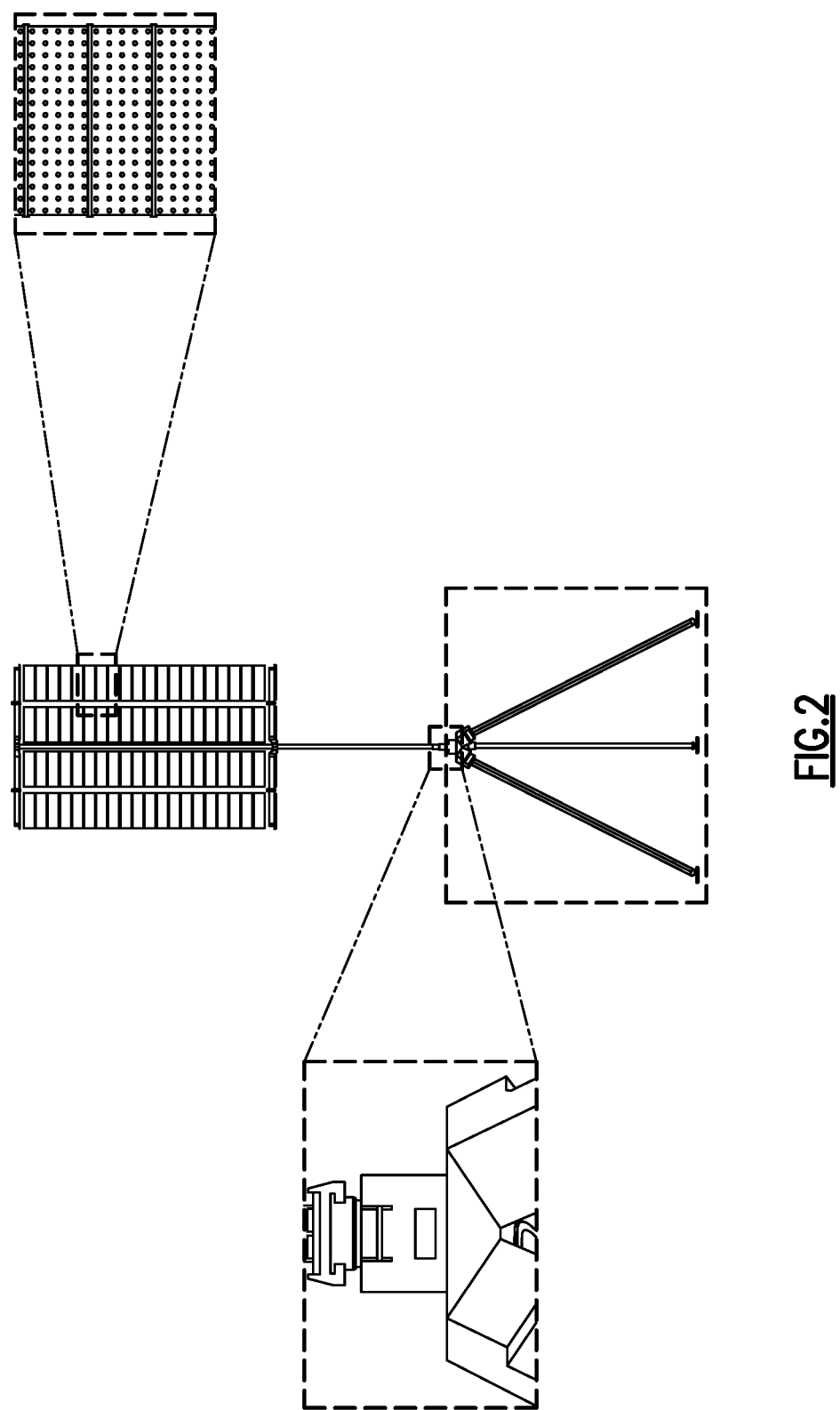
FIG. 2 is a drawing showing the array of FIG. 1 deployed on an optional pedestal with gimbal base.

FIG. 2 is a drawing showing the array of FIG. 1 deployed on an optional pedestal with gimbal base.

Figure 3:
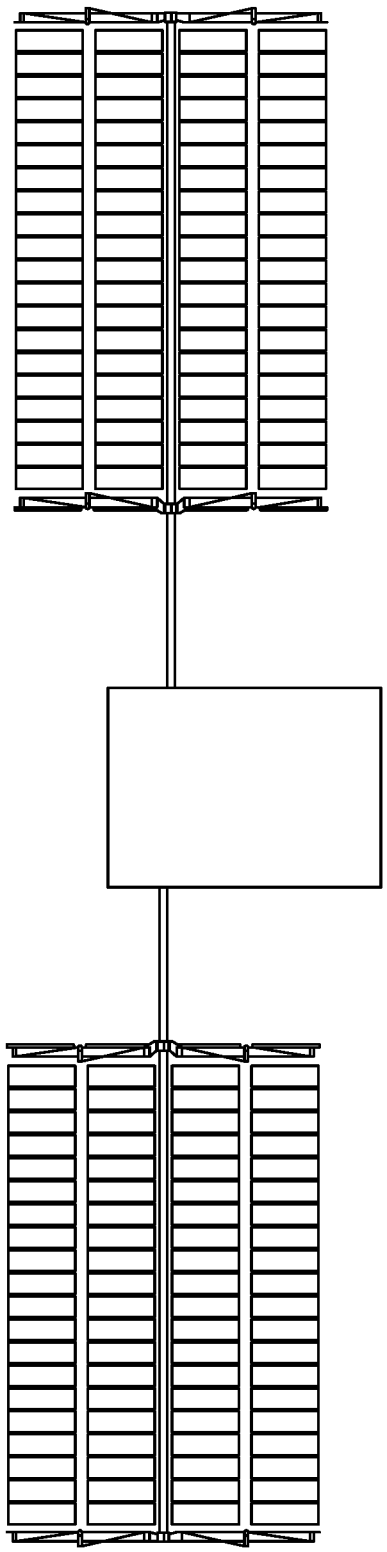
FIG. 3 is a drawing showing the array of FIG. 1 deployed on a satellite.

The retractable mast solar array can also be mechanically coupled to a satellite bus. FIG. 3 is a drawing showing the array of FIG. 1 deployed on a satellite.

Figure 4:
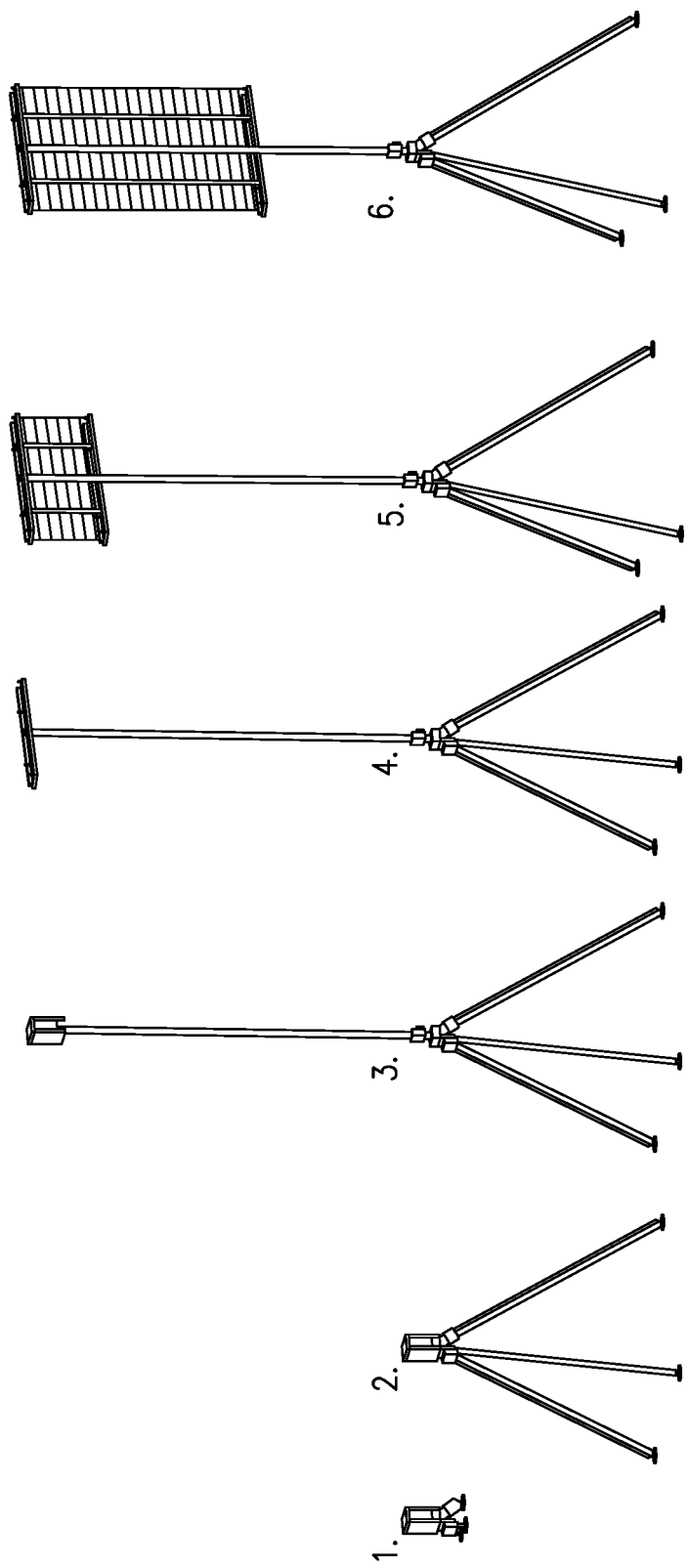
FIG. 4 is a drawing showing an exemplary top down lunar surface deployment sequence of a retractable mast solar array according to the Application.

FIG. 4 is a drawing showing an exemplary top down lunar surface deployment sequence of a retractable mast solar array according to the Application.

Figure 5:
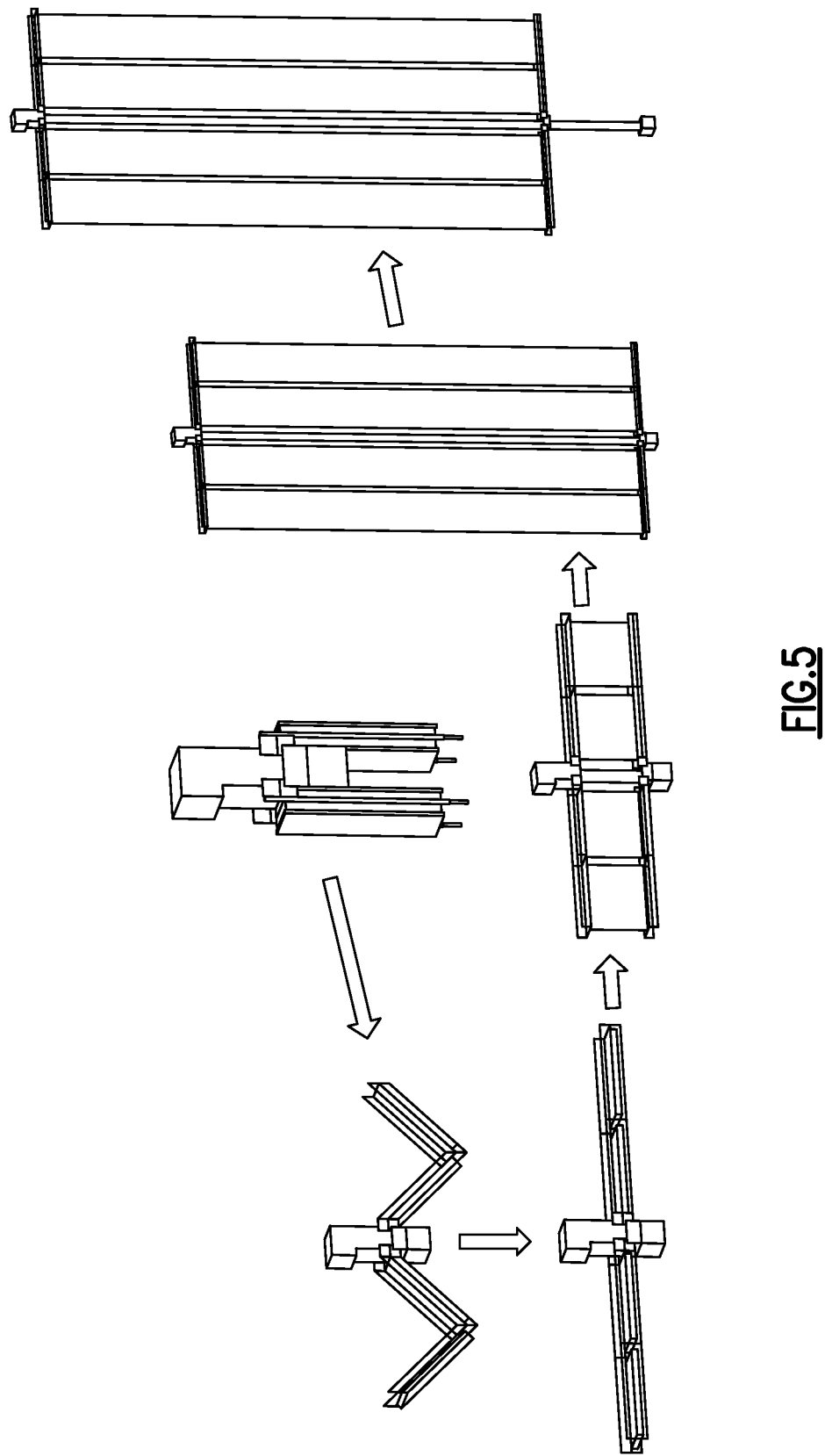
FIG. 5 is a drawing showing an exemplary bottom up down deployment.

The at least one foldable arm assembly and the at least one foldable lower arm assembly can be nestingly folded together in the stowed state. FIG. 5 is a drawing showing an exemplary bottom up down deployment.

Figure 6:
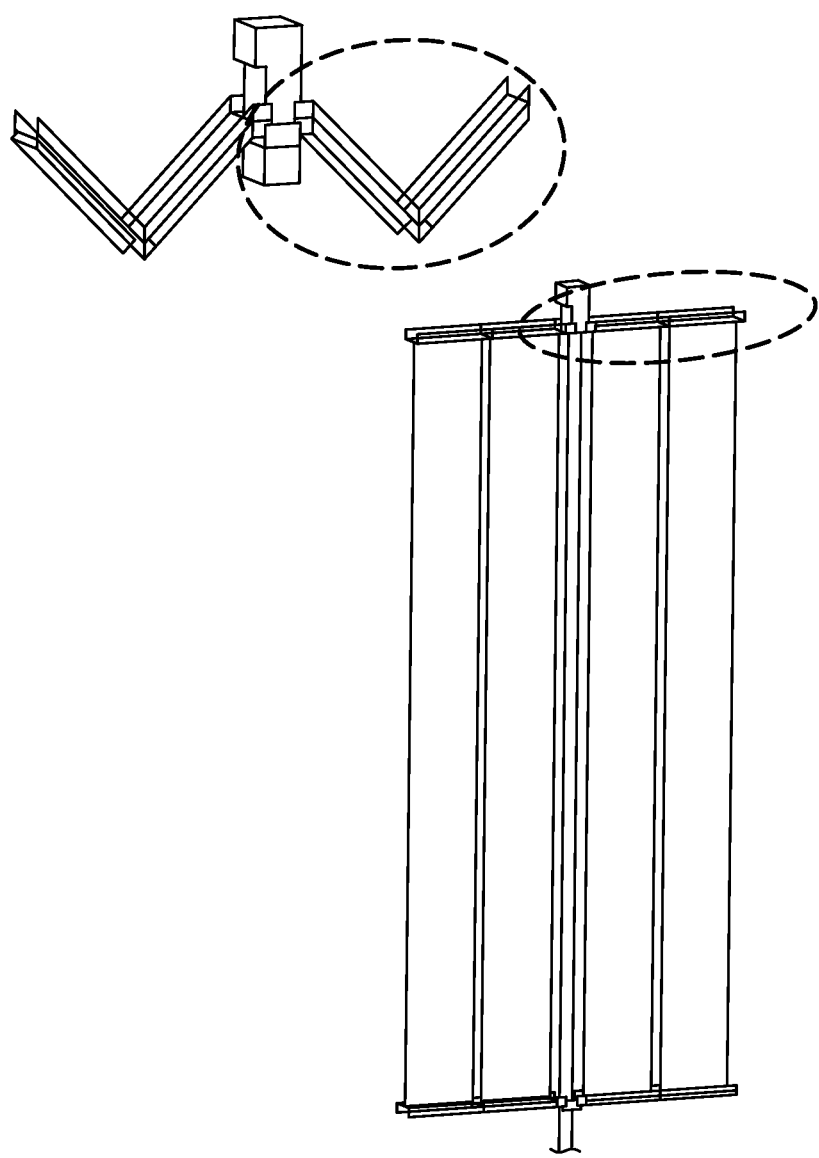
FIG. 6 is a drawing showing an exemplary deployment of parallelogram arms.

FIG. 6 is a drawing showing an exemplary deployment of parallelogram arms. At least one foldable arm can include parallelogram linkages. FIG. 7 is a drawing showing stowed and partially unfolded parallelogram arms. FIG. 8 is a drawing showing exemplary nested lower and upper arm assemblies with blankets stowed.

Figure 9:
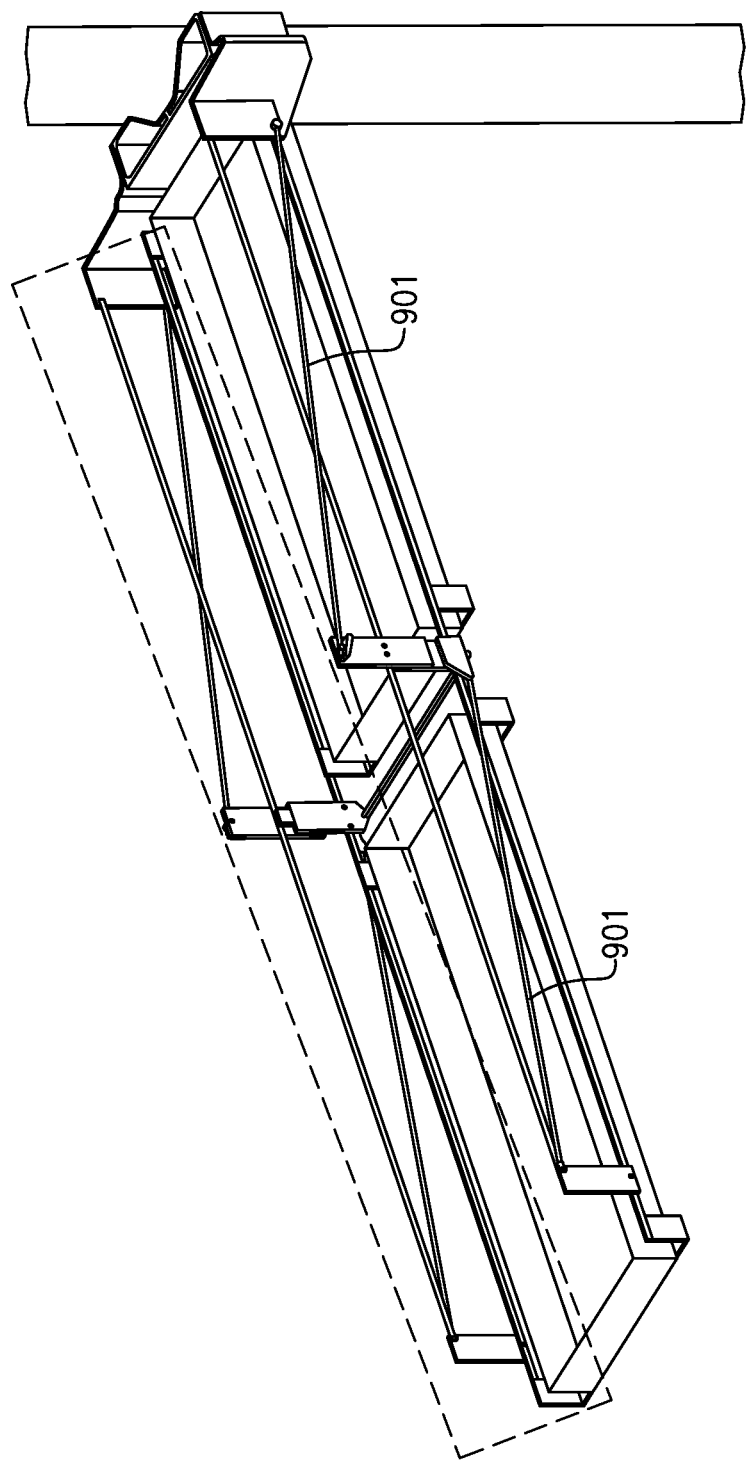
FIG. 9 is a drawing showing more detail of an exemplary unfolded lower arm assembly.

At least one foldable arm can include at least two tension diagonals 901. At least one foldable arm can include a double parallelogram linkage gearing. FIG. 9 is a drawing showing more detail of an exemplary unfolded lower arm assembly.

Figure 10:
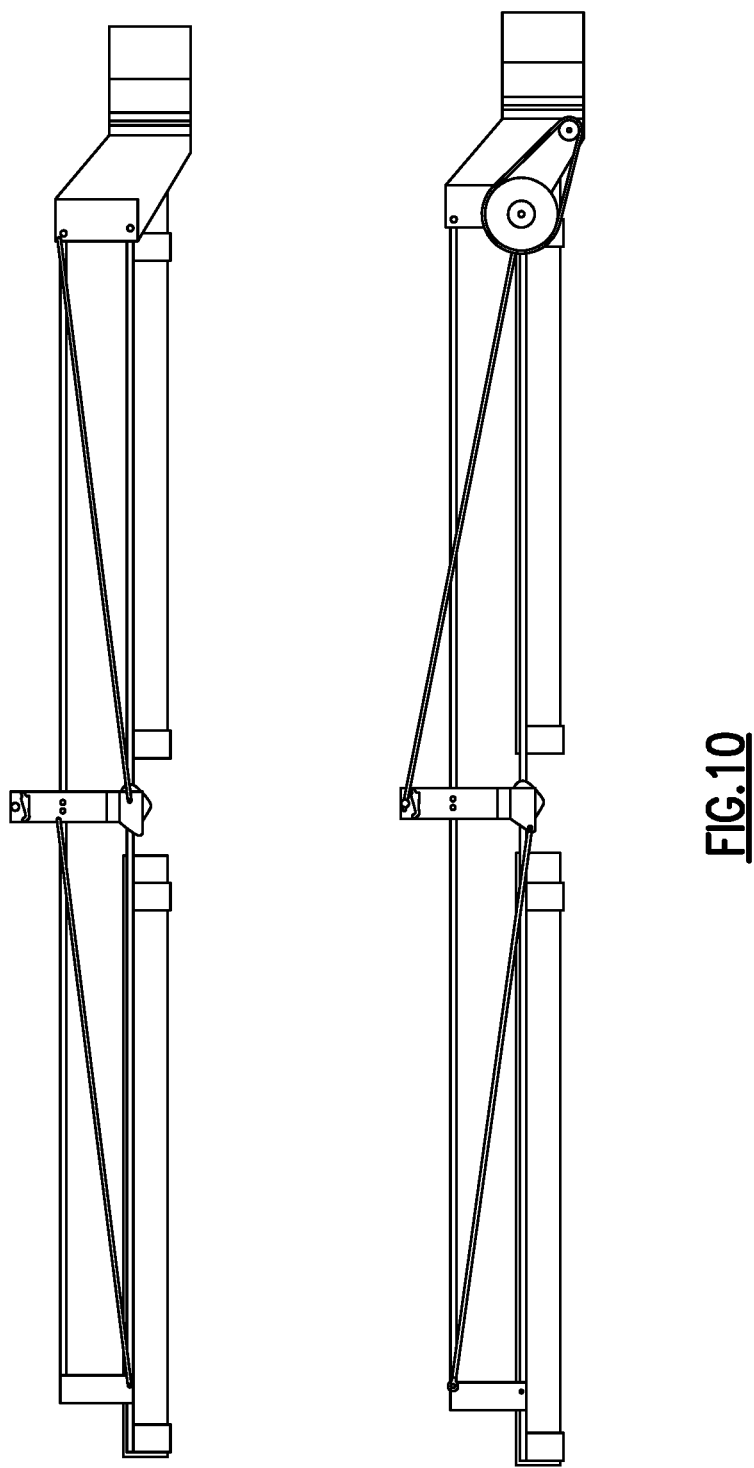
FIG. 10 is a drawing showing an exemplary arm with tension diagonals.
Figure 11:
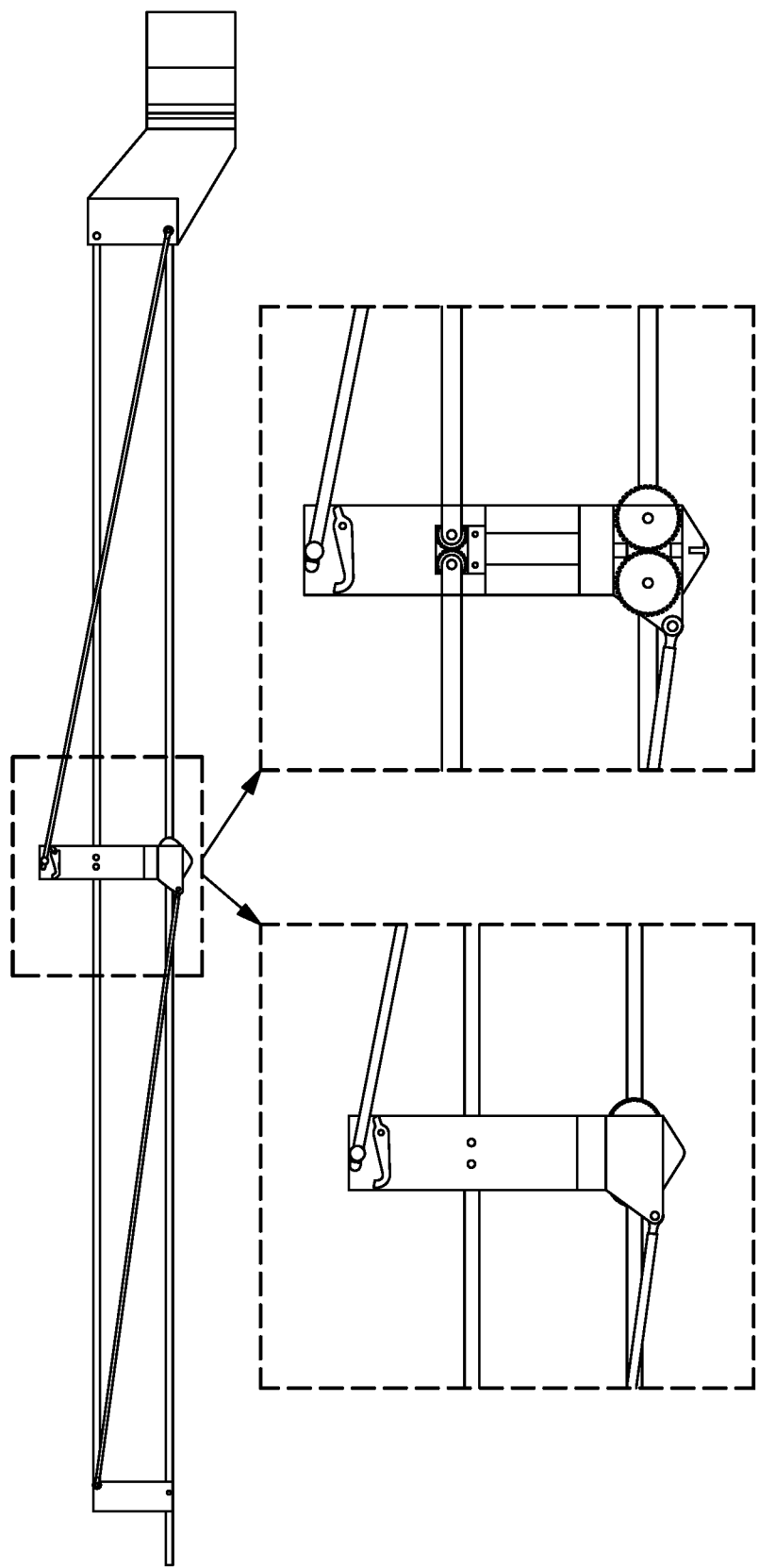
FIG. 11 is a drawing showing an exemplary arm with linkage gearing.

FIG. 10 is a drawing showing an exemplary arm with tension diagonals. FIG. 11 is a drawing showing an exemplary arm with linkage gearing.

Figure 12:
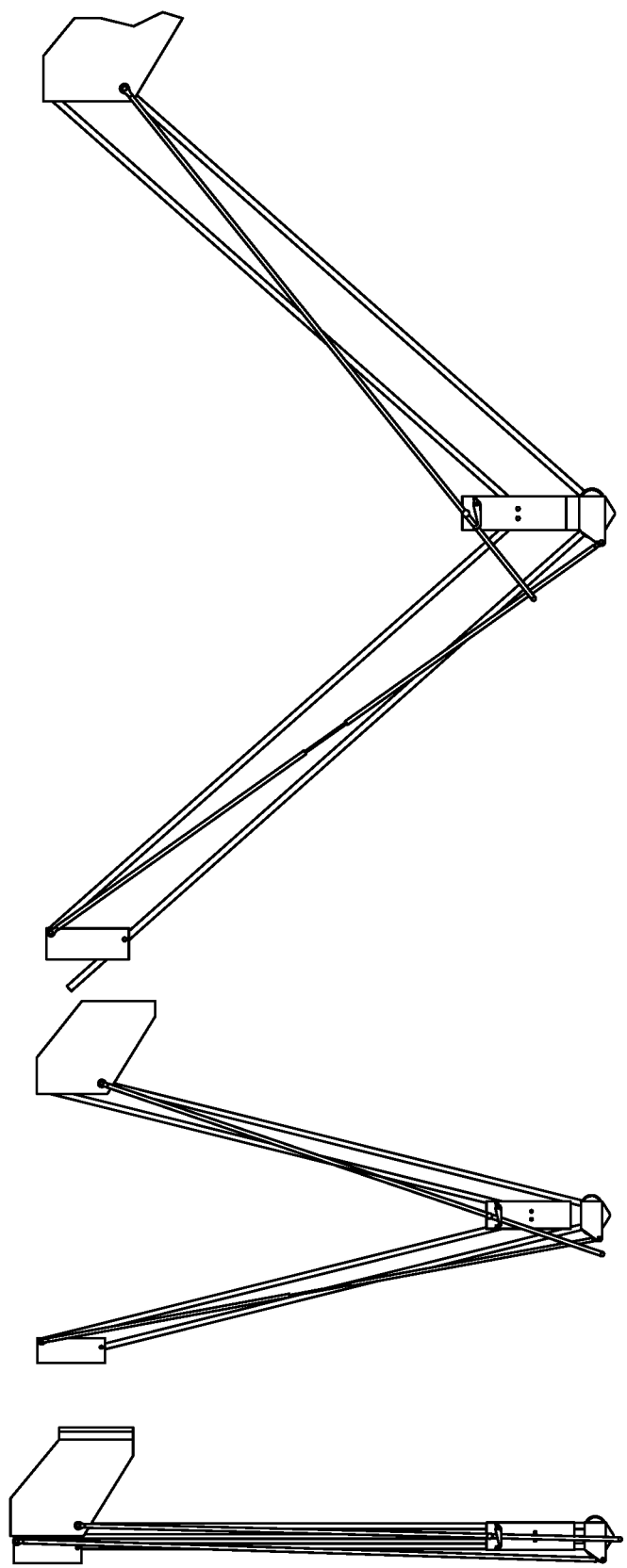
FIG. 12 is a drawing showing the effect of synchronizing gears on deployment/stow dynamics.

At least one foldable arm can include a synchronized gearing. FIG. 12 is a drawing showing the effect of synchronizing gears on deployment/stow dynamics.

Figure 13:
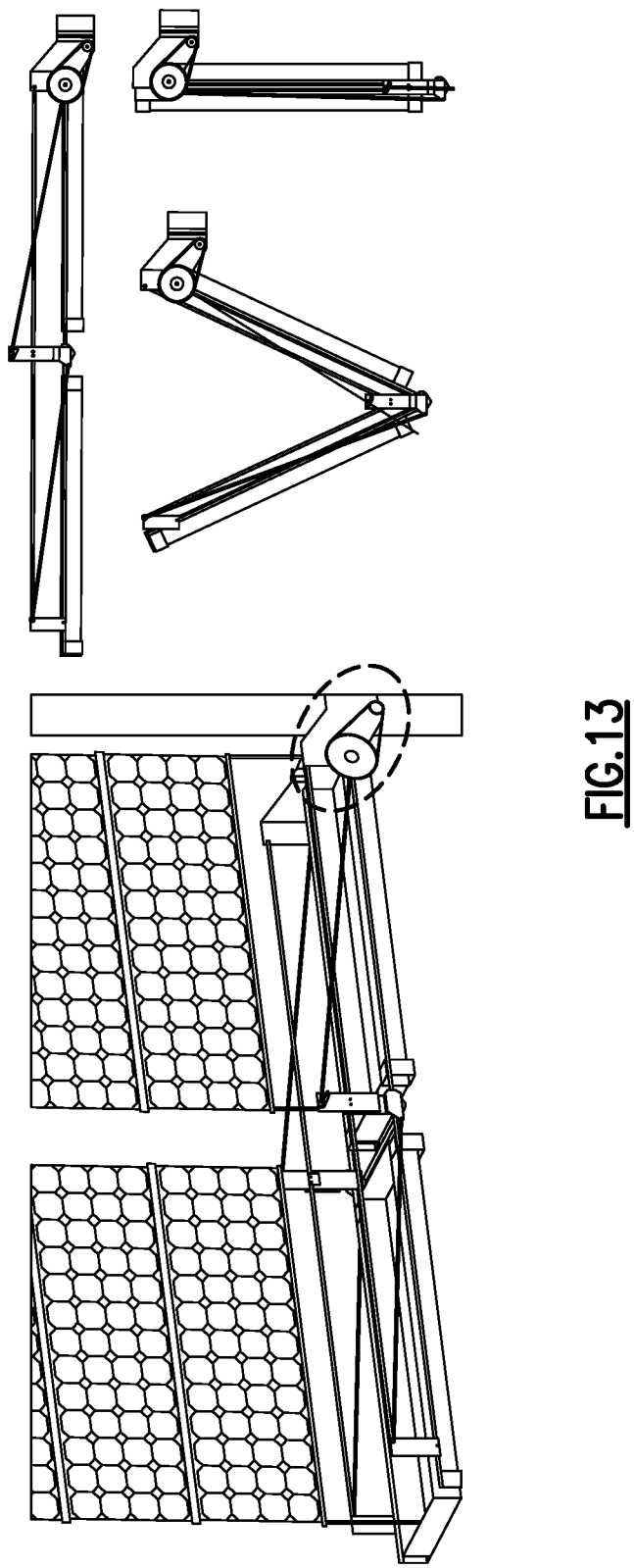
FIG. 13 is a drawing showing folding and unfolding of arms with a motor drive.
Figure 14:
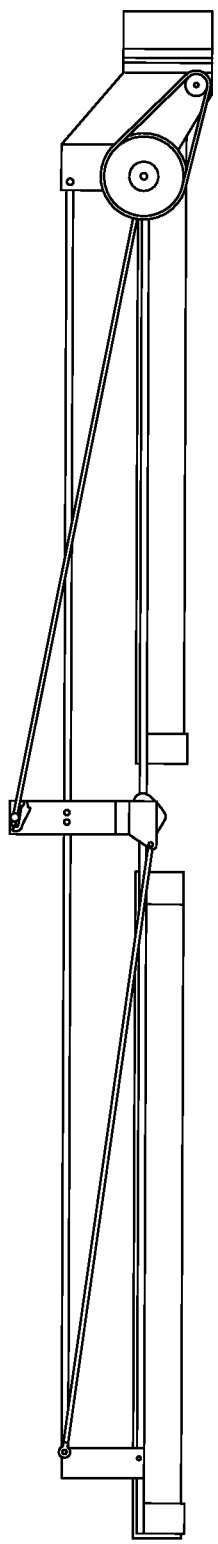
FIG. 14 is a drawing showing an exemplary motor drive with linkage.

At least one foldable arm can include a motor drive. FIG. 13 is a drawing showing folding and unfolding of arms with a motor drive. FIG. 14 is a drawing showing an exemplary motor drive with linkage. FIG. 15 is a drawing showing a top view of the lower arm assembly of FIG. 14 in a both a deployed and stowed state.

Figure 16:
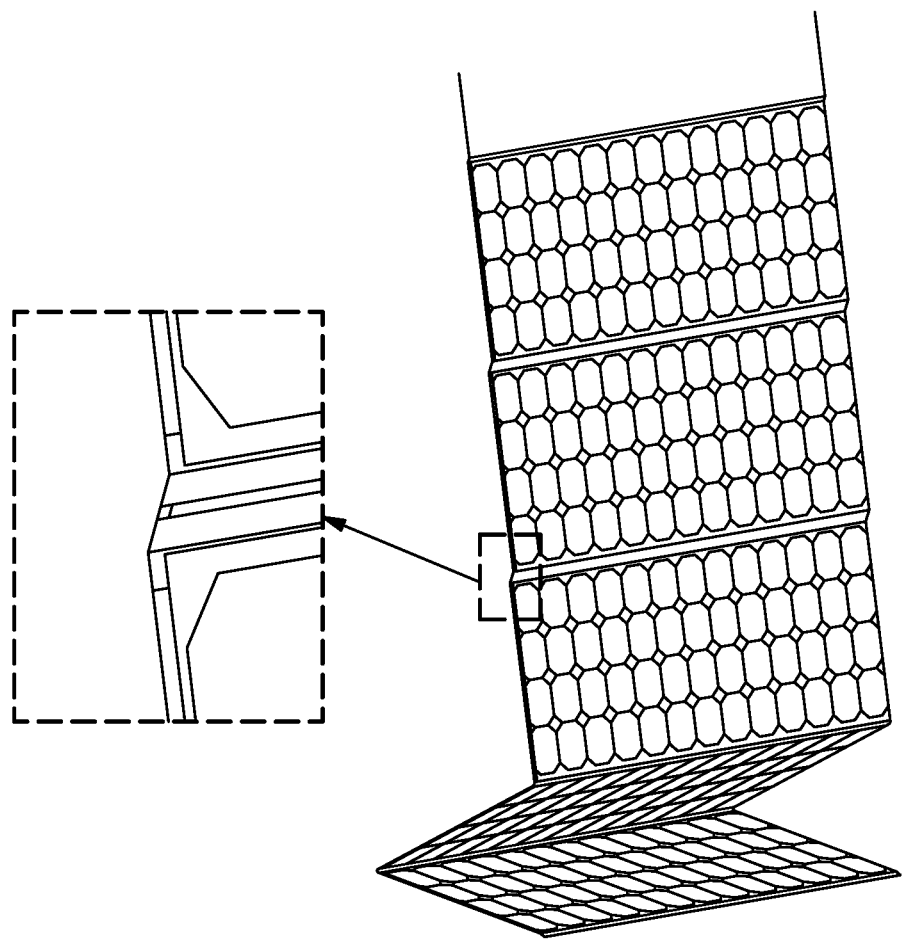
FIG. 16 is a drawing showing an exemplary Z-folding blanket assembly.
Figure 17:
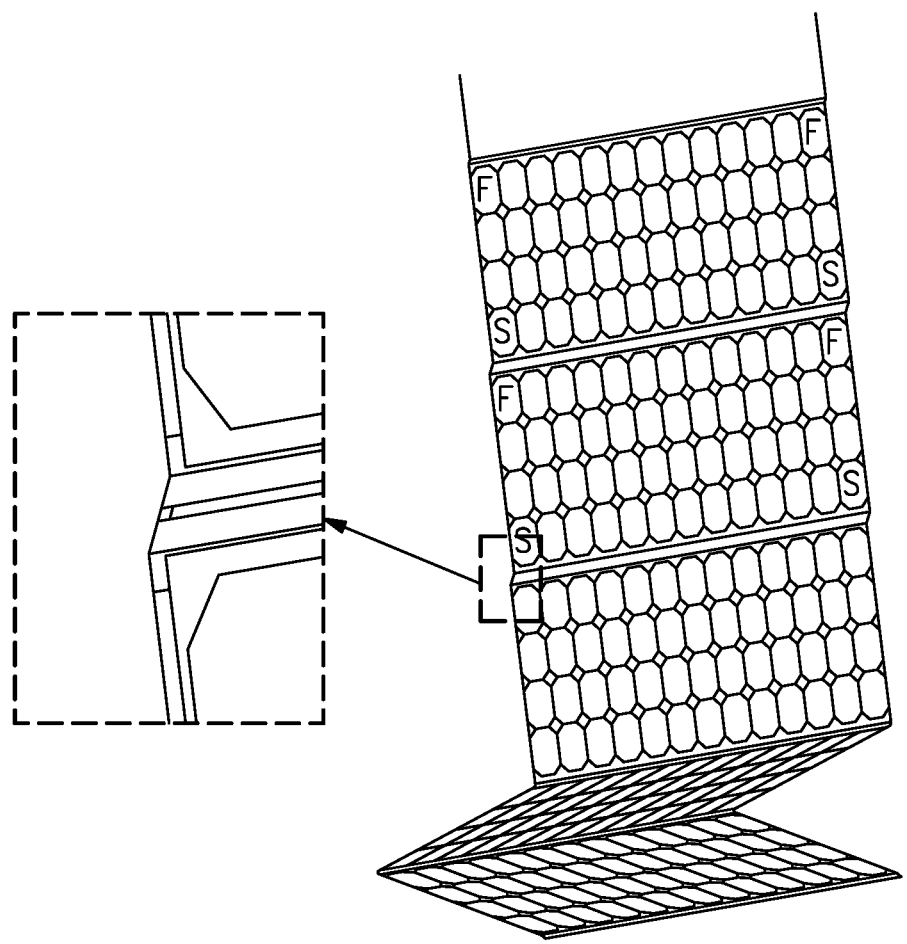
FIG. 17 is a drawing showing more detail of the Z-folding blanket assembly of FIG. 16.
Figure 18:
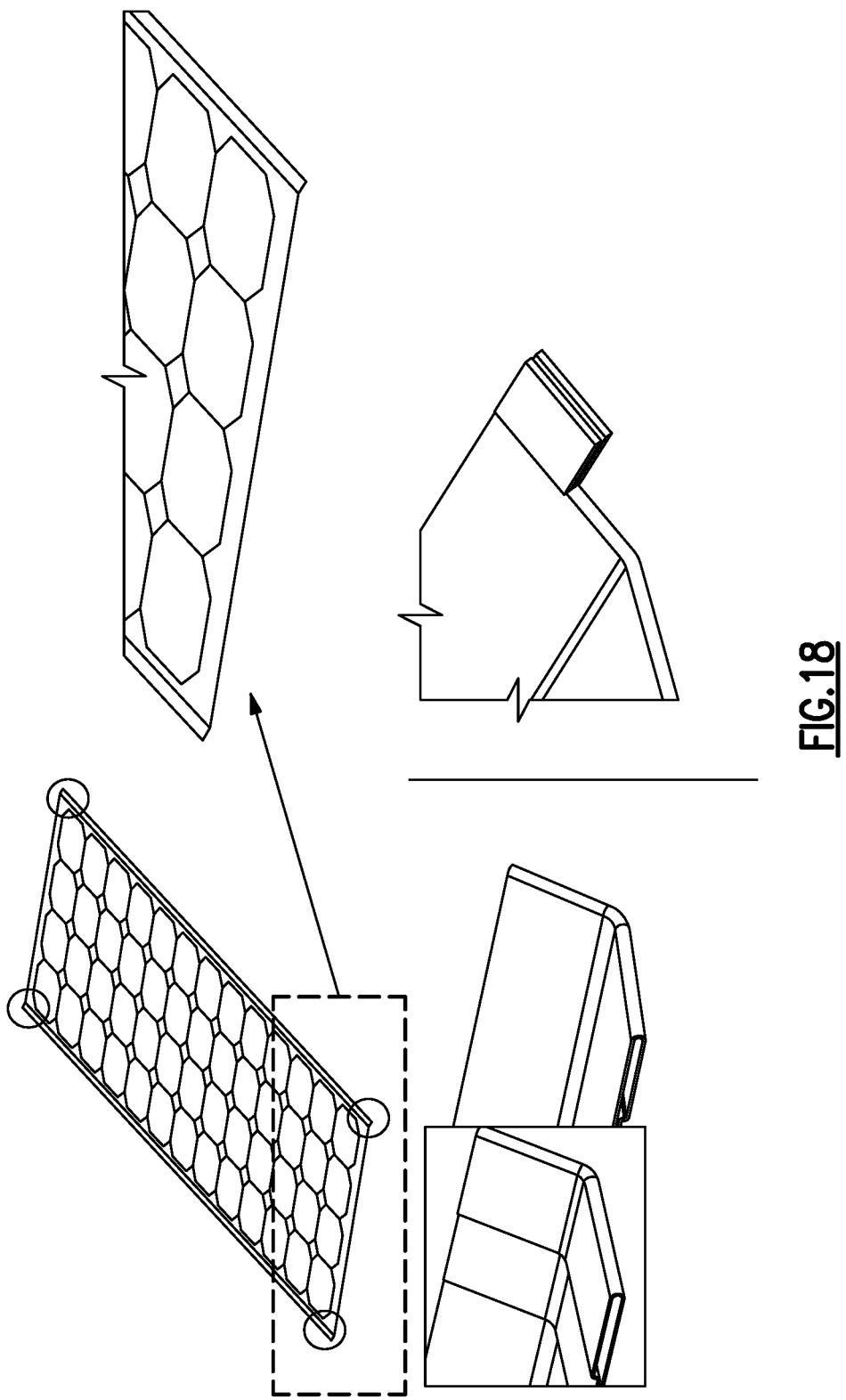
FIG. 18 is a drawing showing an exemplary ribbon interface for a Z-folding blanket.

The foldable solar array can include two or more columns of Z fold blanket elements. Each blanket elements can be coupled to an adjacent blanket element by a pair of ribbons disposed in a columnar direction and mechanically coupled to either side of each of the blanket elements. FIG. 16 is a drawing showing an exemplary Z-folding blanket assembly. FIG. 17 is a drawing showing more detail of the Z-folding blanket assembly of FIG. 16. FIG. 18 is a drawing showing an exemplary ribbon interface for a Z-folding blanket.

Figure 19:
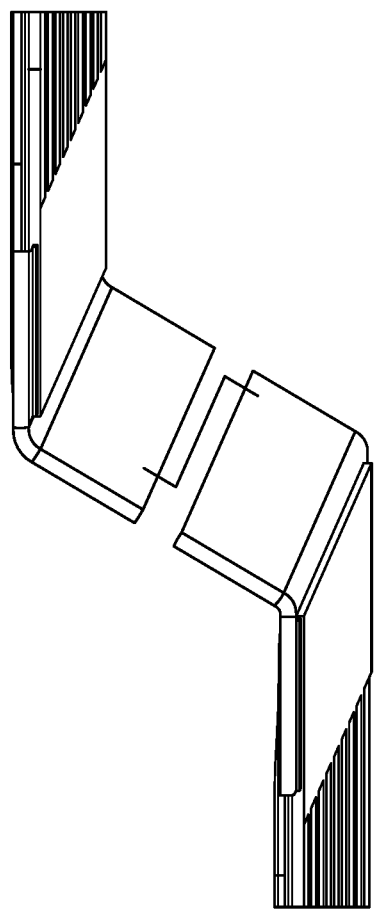
FIG. 19 is a drawing showing an exemplary tension rod for a Z-folding blanket.
Figure 21:
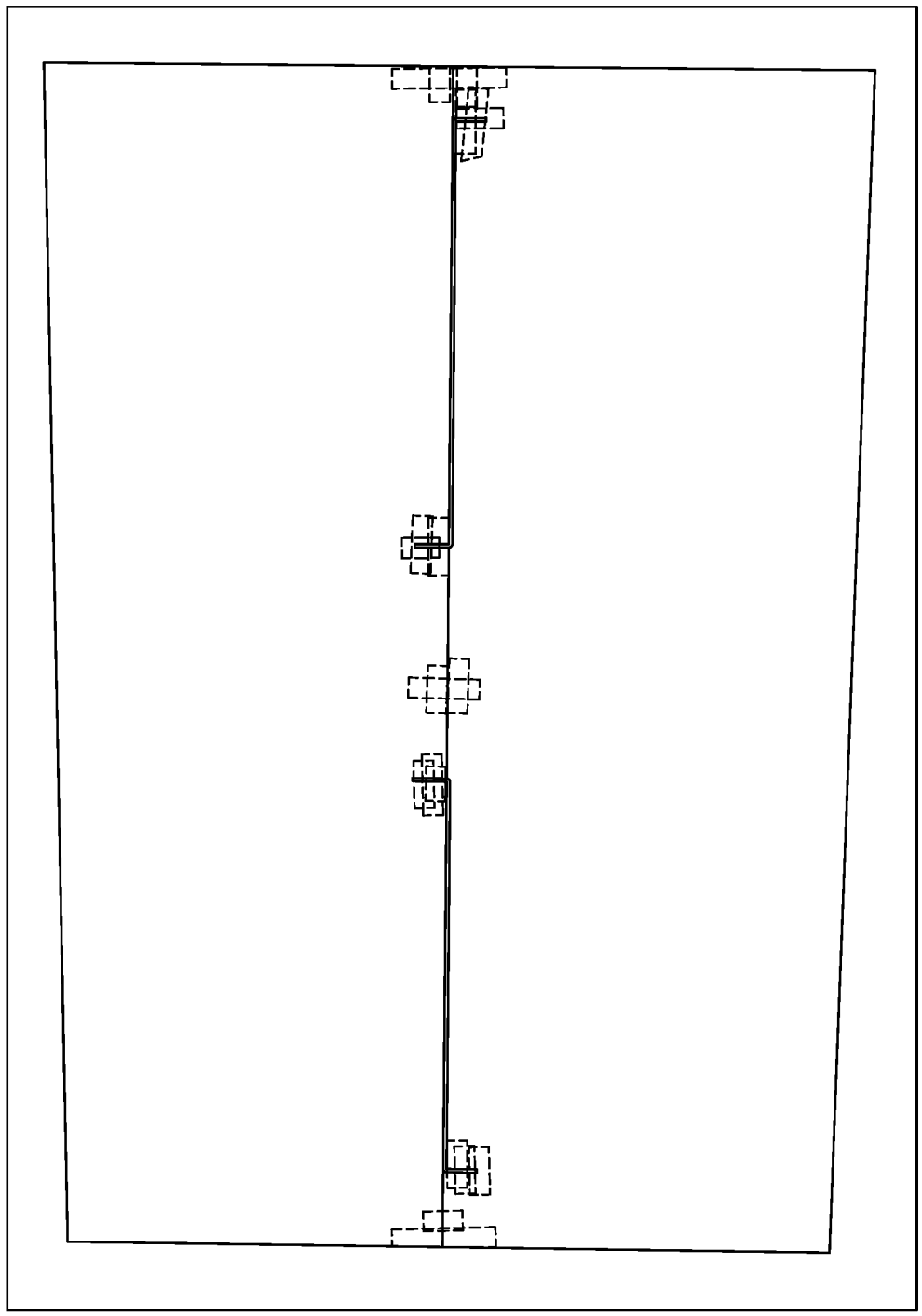
FIG. 21 is a drawing showing a mockup of two sections of a Z-folding blanket with torsion rods.
Figure 23:
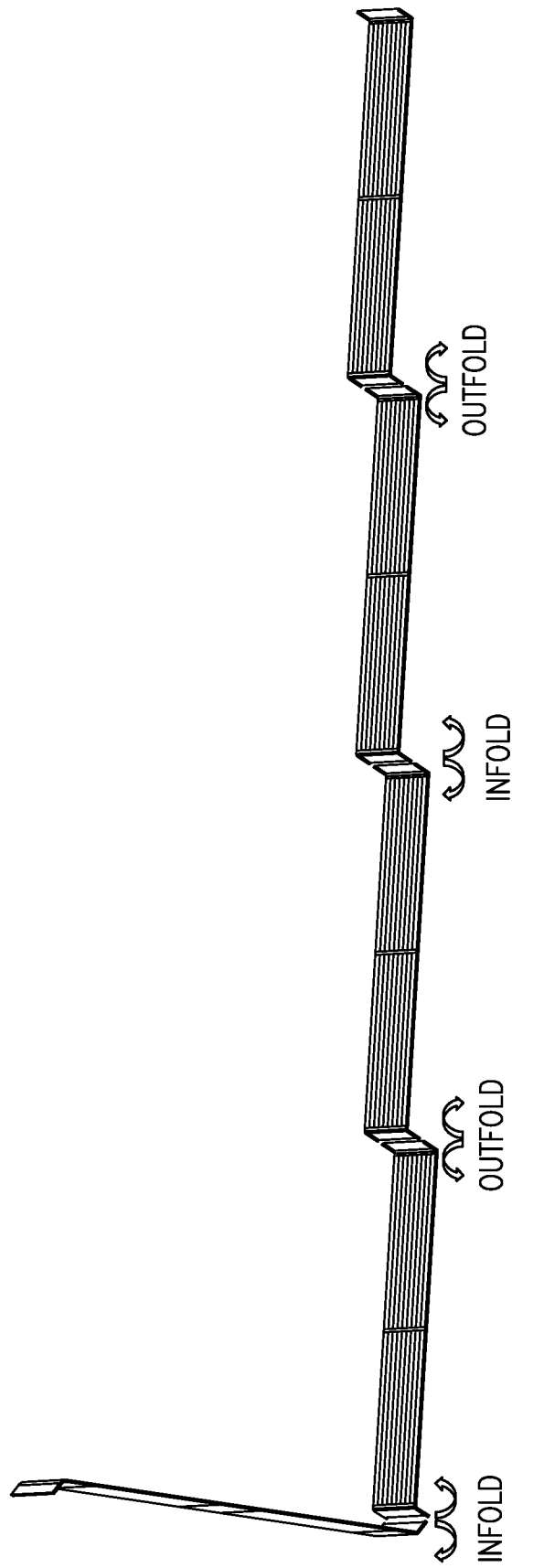
FIG. 23 is a drawing showing directions of torsion rod moments.

At least one torsion rod can be disposed between at least two blanket elements. The at least one torsion rod can provide a spring bias to a folded blanket state. FIG. 19 is a drawing showing an exemplary tension rod for a Z-folding blanket. FIG. 20 is a drawing showing exemplary tension rods installed on a prototype Z-folding blanket. FIG. 21 is a drawing showing a mockup of two sections of a Z-folding blanket with torsion rods;

FIG. 22 is a drawing showing a torsion rod deployed and torsion rod stowed. FIG. 23 is a drawing showing directions of torsion rod moments.

Figure 24:
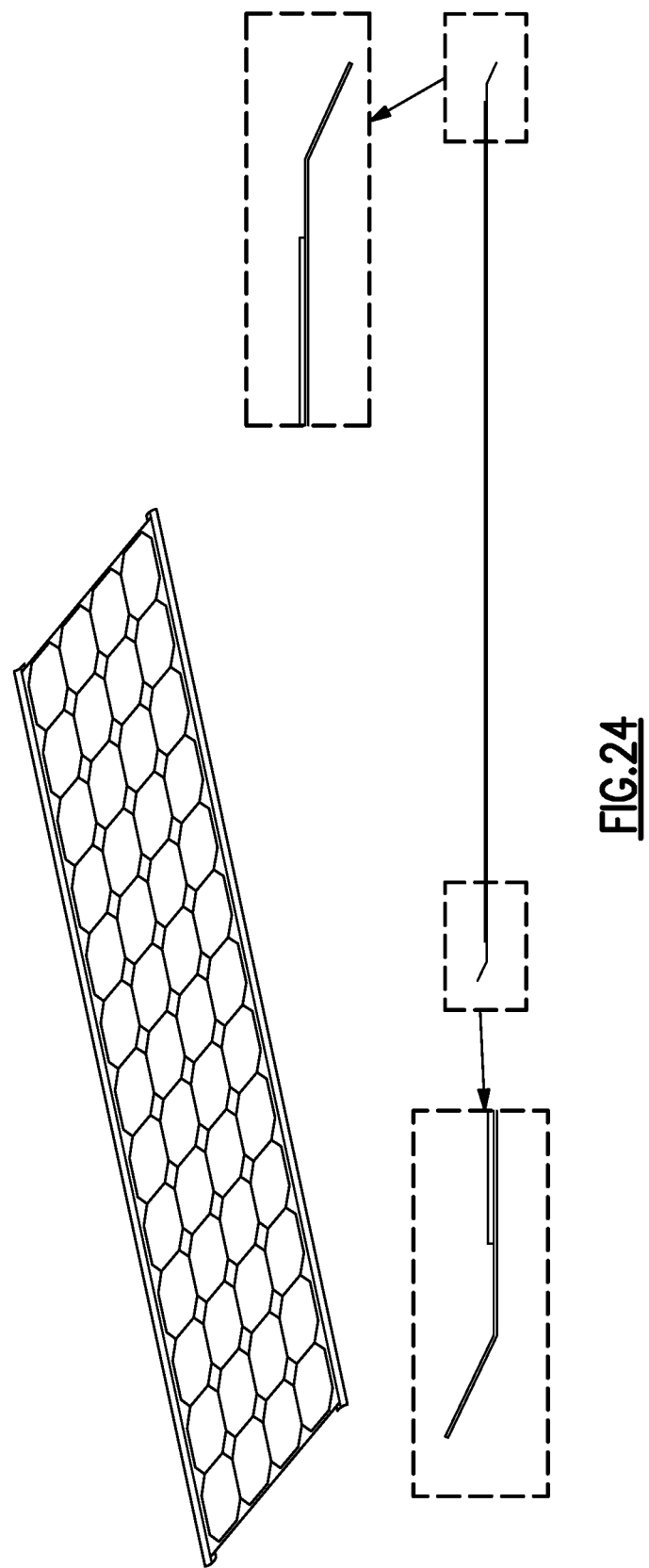
FIG. 24 is a drawing showing and exemplary P-CBE (Populated Composite Blanket Element)

Each blanket element can further include an edge stiffener. FIG. 24 is a drawing showing and exemplary P-CBE (Populated Composite Blanket Element). FIG. 25 is a drawing showing cells bonded to a weave of a of an exemplary CBE layout.

Figure 26:
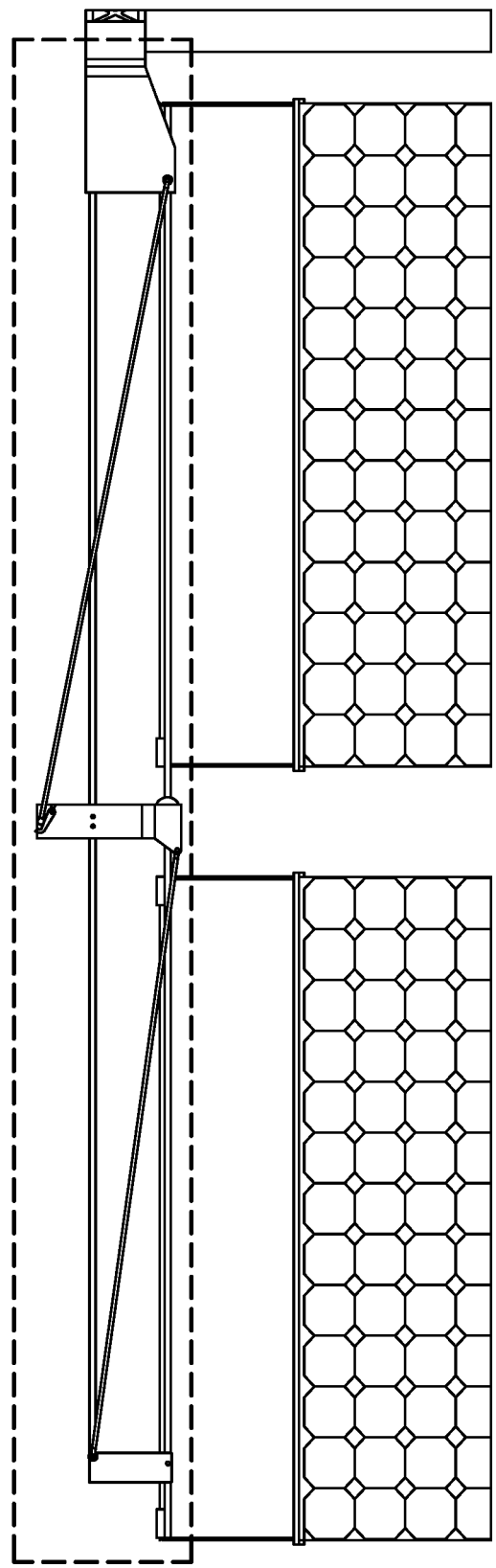
FIG. 26 is a drawing showing blanket assemblies hanging from an upper arm assembly.

FIG. 26 is a drawing showing blanket assemblies hanging from an upper arm assembly.

Alternative deployment strategies—The at least one foldable upper arm assembly can be mechanically coupled at a position on the collapsible boom. During deployment, the at least one foldable lower arm assembly slidingly moves along the collapsible boom away from the at least one foldable upper arm assembly to deploy the foldable solar array to a deployed solar array state. Or, the at least one foldable lower arm assembly can be mechanically coupled at a position on the collapsible boom. During deployment, the at least one foldable upper arm assembly slidingly moves along the collapsible boom away from the at least one foldable lower arm assembly to deploy the foldable solar array to a deployed solar array state.

Alternative blanket storage strategies—Typically the folded blankets are either stored in boxes of either the upper or lower storage arms. The corresponding covers can be attached to the other arms. For example, if the blanket storage boxes are on the lower the arms, the lids to the boxes can be coupled to the upper arms. There can also be storage in part or in half in boxes of any suitable size and/or shaper attached to both of the upper and lower arms.

The retractable mast solar array can further include a base pedestal. FIG. 27 is a drawing showing the deployment stages of an exemplary T-CTM base/pedestal. FIG. 28 is a drawing showing the deployment stages of an exemplary four bar base/pedestal. FIG. 29 is a drawing showing an exemplary base/pedestal on an uneven terrain.

Figure 31:
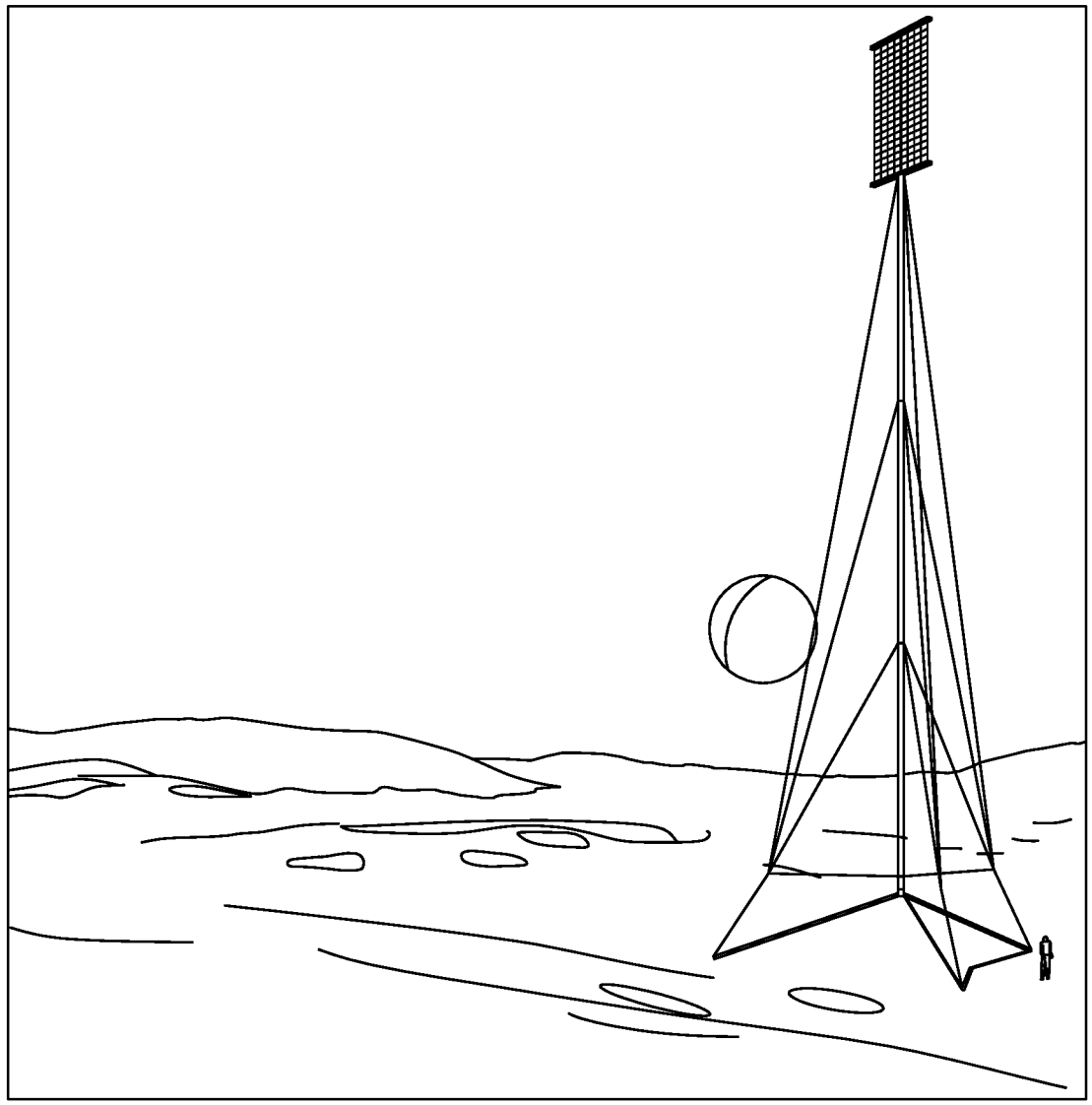
FIG. 31 is another drawing showing an exemplary depiction of a retractable mast solar array according to the Application deployed on the Lunar surface.

FIG. 30 is a drawing showing an exemplary depiction of a retractable mast solar array according to the Application deployed on the lunar surface. FIG. 31 is another drawing showing an exemplary depiction of a retractable mast solar array according to the Application deployed on the lunar surface.

Figure 32:
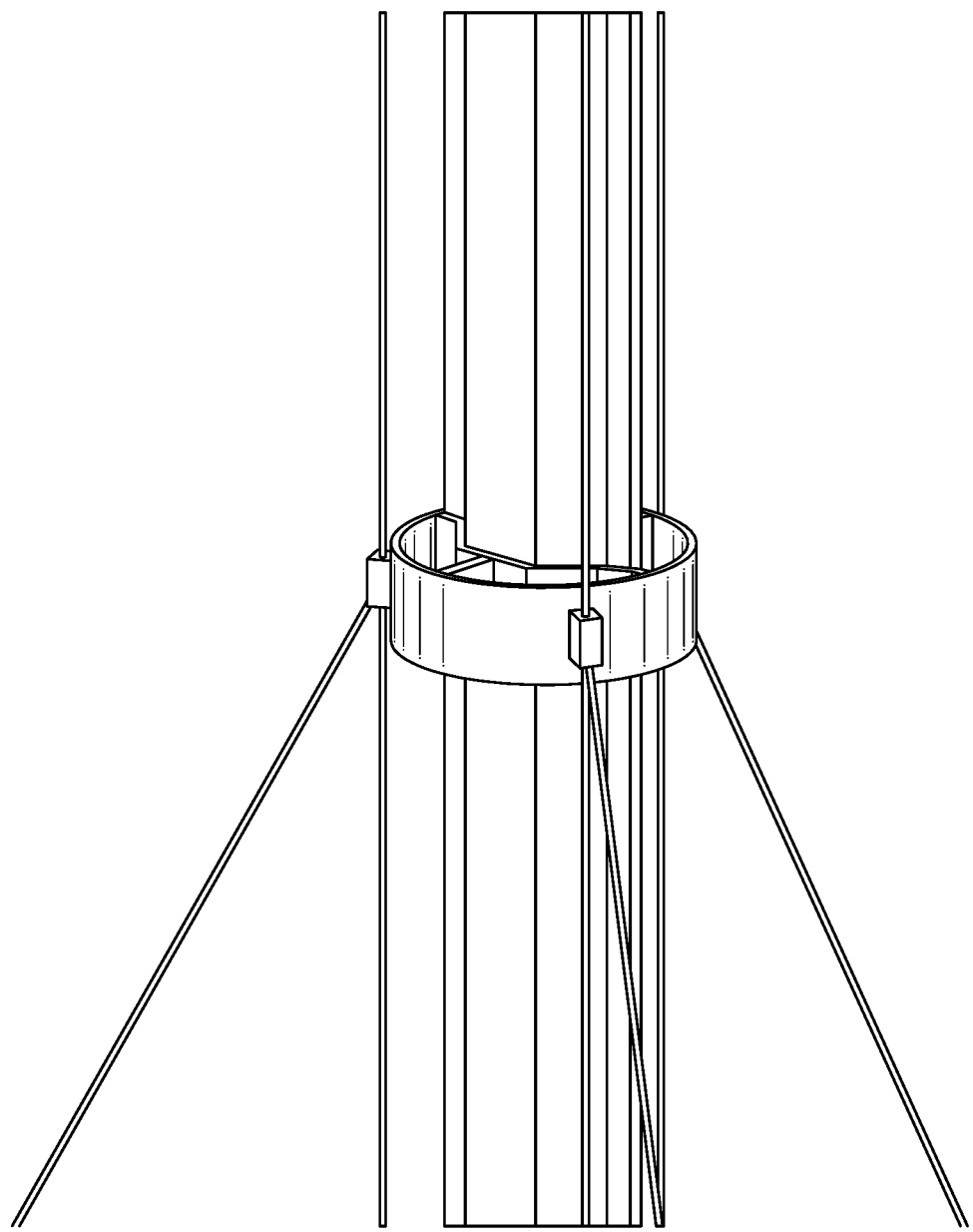
FIG. 32 is a drawing showing an exemplary T-CTM Mast with sliding collar and guy wires.
Figure 33:
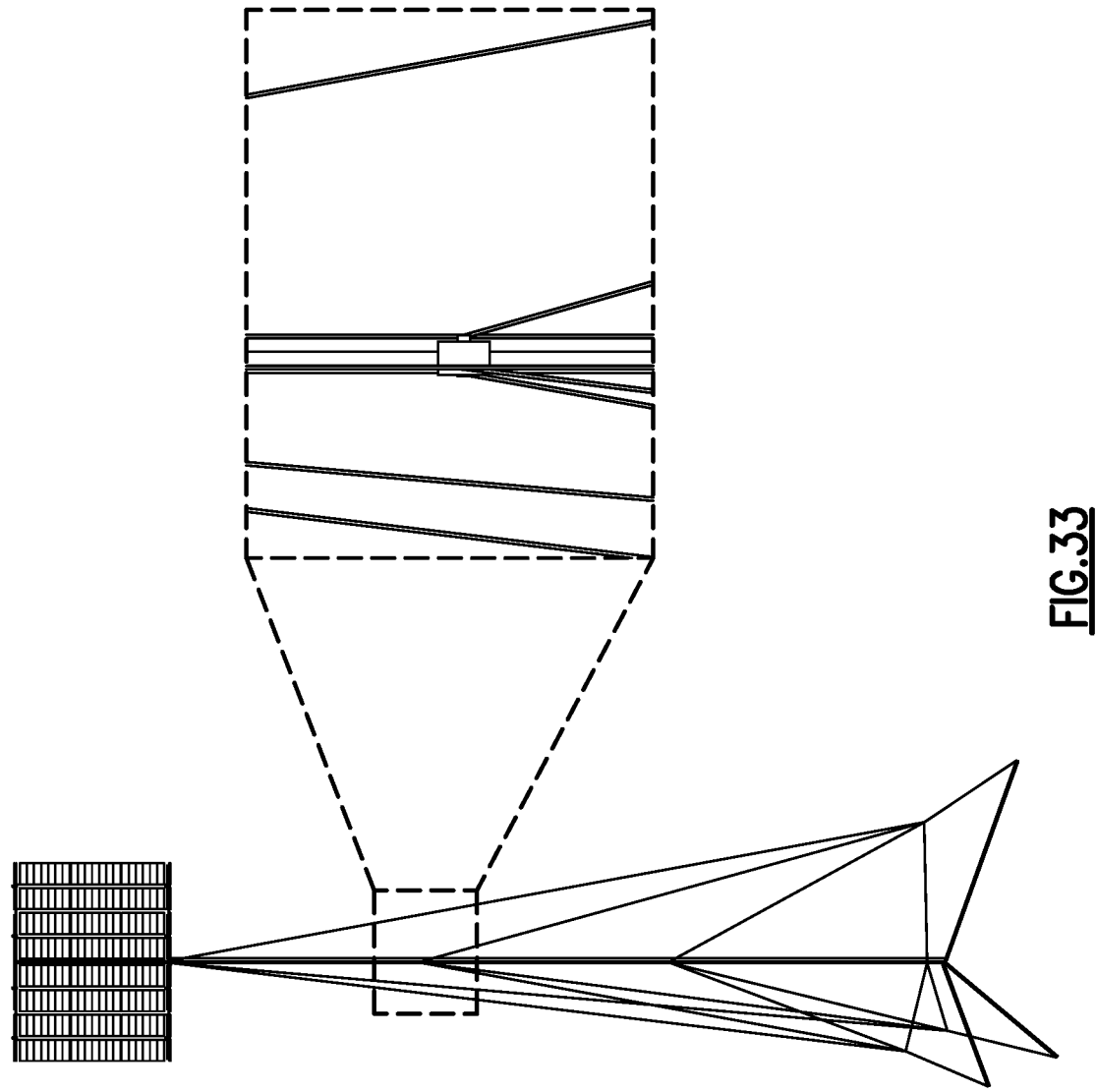
FIG. 33 is a drawing showing an exemplary base with guy wires extending an array 40 meters above a surface.

The base pedestal can include a plurality of guy wires attached to a collar slidingly mounted on the collapsible boom. FIG. 32 is a drawing showing an exemplary T-CTM Mast with sliding collar and guy wires. FIG. 33 is a drawing showing an exemplary base with guy wires extending an array 40 meters above a surface.

The retractable mast solar array can further include additional folded arm sections on either side of the at least one foldable upper arm assembly and the at least one foldable lower arm assembly to support additional columns of blankets. FIG. 34 is a drawing showing exemplary 8, 6, and 4 blanket configurations.

Software and/or firmware to control deployment of a retractable mast solar array according to the Application, control of a base pedestal gimble, control of lower or upper arm deployment, design of any or all of the aforementioned structures, etc., can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A retractable mast solar array comprising:
a collapsible boom extensible by a boom deployer;
an upper arm and a lower arm coupled to said collapsible boom, each said upper and lower arm including first and second arm segments coupled to each other and configured for movement between open and closed positions;
a foldable solar array comprising two or more columns of blanket elements, each column of blanket elements affixed at one end to said upper arm and at an opposite end to said lower arm, adjacent blanket elements of each said column foldably coupled to each other to enable movement of said foldable solar array between a stowed condition and a deployed condition;
wherein:
said upper arm and said lower arm comprises double parallelogram linkages;
said upper arm and said lower arm comprises two tension diagonals; and
said upper arm and said lower arm comprises synchronized gearing;
wherein the double parallelogram linkages are configured for movement between open and closed positions via movement of the two tension diagonals and the synchronized gearing, and wherein the tension diagonals are oriented diagonally with respect to the blanket elements in the open position and oriented parallel with respect to the blanket elements in the closed position,
one or more spring members coupling adjacent blanket elements for moving the adjacent blanket elements to a relative folded state to facilitate movement of said foldable solar array to said stowed condition,
wherein said blanket elements comprise Z fold blanket elements, and
wherein a torsion rod is disposed between adjacent Z fold blanket elements to provide a spring bias to said relative folded state of said adjacent Z fold blanket elements.

2. The retractable mast solar array of claim 1, wherein said collapsible boom comprises a collapsible tubular mast.

3. The retractable mast solar array of claim 2, wherein said collapsible tubular mast comprises a trussed collapsible tubular mast.

4. The retractable mast solar array of claim 1, wherein at least one of said upper arm and said lower arm comprises a motor drive.

5. The retractable mast solar array of claim 1, wherein each blanket element is coupled to an adjacent blanket element by a pair of ribbons disposed in a columnar direction and mechanically coupled to either side of each of said blanket elements.

6. The retractable mast solar array of claim 1, wherein each blanket element further comprises an edge stiffener.

7. The retractable mast solar array of claim 1, wherein said upper arm is mechanically coupled at a position on said collapsible boom, and during deployment, said lower arm slidingly moves along said collapsible boom away from said upper arm to move said foldable solar array to said deployed condition.

8. The retractable mast solar array of claim 1, wherein said lower arm is mechanically coupled at a position on said collapsible boom, and during deployment, said upper arm slidingly moves along said collapsible boom away from said lower arm to deploy said foldable solar array to said deployed condition.

9. The retractable mast solar array of claim 1, further comprising one or more additional arms on either side of said upper arm assembly and said lower arm to support additional columns of blankets.

10. The retractable mast solar array of claim 1, further comprising a base pedestal including a plurality of guy wires attached to a collar slidingly mounted on said collapsible boom.

11. The retractable mast solar array of claim 1, wherein said retractable mast solar array is mechanically coupled to a satellite bus.

12. The retractable mast solar array of claim 1, further including:
- a deployment member coupled to at least a selected one of said upper arm and said lower arm;
- wherein, in a first operation of a sequence of operations, said deployment member slidingly moves along said collapsible boom away from said at least a selected one of said upper arm and said lower arm to move said foldable solar array from said closed position to said open position; and
- wherein, in a second operation of said sequence of operations, said foldable solar array moves from said stowed condition to said deployed condition.

13. The retractable mast solar array of claim 12, wherein said deployment member is configured to cause movement of each said upper arm and said lower arm from said closed position to said open position during said first operation.

14. The retractable mast solar array of claim 12, wherein at least one column of said two or more columns includes:
- a first blanket element foldably coupled to a second blanket element; and
- a third blanket element foldably coupled to said second blanket element;
- wherein said first and second blanket elements are biased toward said relative folded state thereof in a first direction; and
- wherein said second and third blanket elements are biased toward said relative folded state thereof in a second direction opposite said first direction.

15. A retractable mast solar array comprising:
- a collapsible boom extensible by a boom deployer;
- an upper arm and a lower arm coupled to the collapsible boom, the upper and lower arms configured for movement between open and closed positions;
- a foldable solar array comprising two or more columns of blanket elements, each column of blanket elements affixed at one end to said upper arm and at an opposite end to said lower arm, adjacent blanket elements within each column foldably coupled to each other;
- wherein:
    - said upper arm and said lower arm comprises double parallelogram linkages;
    - said upper arm and said lower arm comprises two tension diagonals; and
    - said upper arm and said lower arm comprises synchronized gearing;
        - wherein the double parallelogram linkages are configured for movement between open and closed positions via movement of the two tension diagonals and the synchronized gearing, and wherein the tension diagonals are oriented diagonally with respect to the blanket elements in the open position and oriented parallel with respect to the blanket elements in the closed position; and
- a foldable ribbon extending in a columnar direction and coupling adjacent columns of blanket elements;
- wherein, in a stowed condition of the foldable solar array, the ribbon is folded upon itself and the blanket elements are disposed in superposed relation;
- wherein, in a deployed condition of the foldable solar array, the ribbon is substantially linear and the blanket elements are open,
- wherein said blanket elements comprise Z fold blanket elements, and
- wherein a torsion rod is disposed between adjacent Z fold blanket elements to provide a spring bias to a relative folded state of said adjacent Z fold blanket elements.

16. The retractable mast solar array of claim 15 including:
- an interface structure coupling adjacent blanket elements within each column of blanket elements and separating the adjacent blanket elements a predetermined distance.

17. The retractable mast solar array of claim 16 wherein the interface structure includes a fixed interface and a sliding interface.

18. The retractable mast solar array of claim 16 wherein at least one of the ribbon or the interface structure includes a slot or bend to facilitate folding movement thereof.

* * * * *